(12) United States Patent
Abouelseoud et al.

(10) Patent No.: US 10,499,320 B2
(45) Date of Patent: Dec. 3, 2019

(54) MESH ASSISTED NODE DISCOVERY

(71) Applicant: SONY CORPORATION, Tokyo (JP)

(72) Inventors: Mohamed Abouelseoud, San Francisco, CA (US); Ramy Abdallah, San Jose, CA (US); Kazuyuki Sakoda, Campbell, CA (US)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 15/676,257

(22) Filed: Aug. 14, 2017

(65) Prior Publication Data

US 2019/0053133 A1    Feb. 14, 2019

(51) Int. Cl.
| | | |
|---|---|---|
| *H04W 48/16* | (2009.01) | |
| *H04W 40/24* | (2009.01) | |
| *H04W 8/00* | (2009.01) | |
| *H04W 84/18* | (2009.01) | |
| *H04W 88/08* | (2009.01) | |
| *H04W 84/12* | (2009.01) | |
| *H04L 12/26* | (2006.01) | |
| *H04W 72/08* | (2009.01) | |

(52) U.S. Cl.
CPC ........... *H04W 48/16* (2013.01); *H04W 8/005* (2013.01); *H04W 40/244* (2013.01); *H04L 43/12* (2013.01); *H04W 72/085* (2013.01); *H04W 84/12* (2013.01); *H04W 84/18* (2013.01); *H04W 88/08* (2013.01)

(58) Field of Classification Search
CPC ....... H04B 7/0695; H04B 7/088; H04L 41/12; H04L 43/12; H04W 40/12; H04W 40/16; H04W 56/005; H04W 72/082; H04W 84/18; H04W 84/22; H04W 8/005; H04W 40/244; H04W 48/16; H04W 72/085; H04W 84/12; H04W 88/08
See application file for complete search history.

(56) References Cited

U.S. PATENT DOCUMENTS

| | | |
|---|---|---|
| 7,606,175 B1 | 10/2009 | Maufer |
| 9,474,009 B2 | 10/2016 | Deenoo et al. |

(Continued)

FOREIGN PATENT DOCUMENTS

WO    2014/124048 A1    8/2014

OTHER PUBLICATIONS

ISA/EP, European Patent Office (EPO) International Search Report and Written Opinion dated Nov. 26, 2018, related PCT international application No. PCT/IB2018/055575, pp. 1-13, claims searched, pp. 14-19.

(Continued)

*Primary Examiner* — Khaled M Kassim
*Assistant Examiner* — Zhaohui Yang
(74) *Attorney, Agent, or Firm* — O'Banion & Ritchey LLP; John P. O'Banion

(57) ABSTRACT

Wireless mesh networking protocols are taught that provide neighbor node discovery in a network utilizing directional transmissions. The established mesh network is utilized to trigger stations in the mesh network to assist in neighbor discovery. The new node joining the network then does not need to wait for beacons from other mesh nodes in starting the process to join the mesh network. In this way the discovery of available nodes is accelerated. Numerous variations and scenarios of the apparatus and method are described.

23 Claims, 18 Drawing Sheets

(56) References Cited

U.S. PATENT DOCUMENTS

| | | | | |
|---|---|---|---|---|
| 2009/0232042 | A1* | 9/2009 | Kneckt | H04L 12/12 370/312 |
| 2009/0287816 | A1* | 11/2009 | Matta | H04L 43/50 709/224 |
| 2010/0254308 | A1 | 10/2010 | Laroia et al. | |
| 2013/0331097 | A1 | 12/2013 | Kang et al. | |
| 2015/0017979 | A1 | 1/2015 | Kang et al. | |
| 2015/0109943 | A1* | 4/2015 | Sahin | H04W 24/02 370/252 |

OTHER PUBLICATIONS

Kumar, Sukanta, H. et al., "Efficient Neighbour Discovery Algorithm for Maritime Mesh Networks with Directional Antennas," ITS Telecommunications, 2008; ITST 2008; 8th International Conference, Piscataway, NJ, USA, Oct. 24, 2008, pp. 6-11.

* cited by examiner

MESH ASSISTED NODE DISCOVERY

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless communications between stations, and more particularly to multiple-hop relayed directional wireless communication which perform mesh assisted node (station) discovery.

2. Background Discussion

There is an ongoing need for increasing the capacity of wireless networks, and network operators have begun to embrace the idea of densification, and they are working towards supporting increased network traffic density. Current sub-6 GHz wireless technology and protocols do not sufficiently provide for the high data demand.

One alternative approach is to use more spectrum in the 30-300 GHz band, millimeter wave band (mmW). Yet, enabling mmW wireless systems in general requires properly dealing with channel impairments and propagation characteristics at these high frequency bands; such as high free-space path loss, high penetration, reflection and diffraction losses which reduce available diversity and limit non-line-of-sight (NLOS) communications. Beneficially though, the small wavelength of mmW, enables the use of high-gain electronically steerable directional antennas of practical dimensions, which can provide sufficient array gain to overcome path loss and ensure high Signal-to-Noise Ratio (SNR) at the receiver.

Existing wireless systems and protocols do not make full use of the capabilities in these millimeter wave bands, and lack efficient mechanisms for mesh discovery.

Accordingly, a need exists for mesh discovery apparatus and protocols which are practical for mm-wave directional wireless networks. The present disclosure fulfills those needs, as well as others, while providing additional benefits over existing direction wireless apparatus and protocols.

BRIEF SUMMARY

Directional mesh networks in dense deployment environments and mmW band are an efficient way to achieve reliable communication between nodes (stations) and overcome line-of-sight channel restrictions. A new node (STA) starting up in a network will be searching for neighboring nodes to discover and a network to join. The process of initial access of a node to a network comprises scanning for neighboring nodes and discovering all active nodes in its wireless vicinity. This can be performed either through the new node searching for a specific network/list of networks to join, or the new node sending a broadcast request to join any already established network that will accept the new node.

A node connecting to a mesh network will need to discover all neighboring nodes to decide on the manner to reach gateway nodes or portal mesh nodes, and the capabilities of each of these neighboring nodes. The new node examines every channel for possible neighboring nodes for a specific period of time. If no active node is detected after that specific time, the node moves to the next channel. When a node is detected, the new node is required to collect sufficient available information to configure its PHY for operation in the regulatory domain.

This task for new nodes joining a network is further challenging in mmWave communications due to directional transmissions. The challenges in this process can be summarized as: (a) knowledge of surrounding nodes IDs; (b) knowledge of best transmission pattern for beamforming; (c) channel access issues due to collisions and deafness; and (d) channel impairments due to blockage and reflections.

Providing a neighborhood discovery method to overcome some or all of the above problems is important to obtain pervasive use of mmWave D2D and mesh technologies. Existing technologies for mesh networking are only designed to address mesh discovery for networks operating in broadcast mode and are not directed to operating on networks having directional wireless communications.

A number of terms are utilized in the disclosure whose meanings are generally utilized as described below.

A-BFT: Association-Beamforming Training period; a period announced in the beacons that is used for association and BF training of new stations joining the network. It will be noted that beacons are packets transmitted at the beginning of each super frame to announce the WLAN and help in the synchronization process.

AP: access point; an entity that contains one station (STA) and provides access to distribution services, through the wireless medium (WM) for associated STAs.

Beamforming (BF): A directional transmission that does not use an omnidirectional antenna pattern or quasi-Omni antenna pattern. It is used at a transmitter to improve the received signal power or signal-to-noise ratio (SNR) at an intended receiver.

BSS: basic service set; a set of stations (STAs) that have successfully synchronized with an AP in the network.

BI: The Beacon Interval is a cyclic super frame period that represents the time between beacon transmission times.

BRP: BF refinement protocol; A BF protocol that enables receiver training and performs iterative training of the transmitter and receiver sides to achieve the best possible directional communications.

CBAP: contention-based access period; The time period within the data transfer interval (DTI) of a directional multi-gigabit (DMG) BSS where contention-based enhanced distributed channel access (EDCA) is used.

DTI: Data Transfer Interval; the period whereby full BF training is permitted followed by actual data transfer. It can include one or more service periods (SPs) and contention-based access periods (CBAPs).

MAC address: A medium access control (MAC) address.

MBSS: Mesh basic service set, A basic service set (BSS) that forms a self-contained network of Mesh Stations (MS-TAs), and which may be used as a distribution system (DS).

MCS: modulation and coding scheme; an index that can be translated into the PHY layer data rate.

MSTA: Mesh station (MSTA): A station (STA) that implements the Mesh facility. An MSTA that operates in the Mesh BSS may provide the distribution services for other MSTAs.

Omni directional: A non-directional antenna mode of transmission.

Quasi-Omni directional: A directional multi-gigabit (DMG) antenna operating mode with the widest beamwidth attainable.

Receive sector sweep (RXSS): Reception of Sector Sweep (SSW) frames via different sectors, in which a sweep is performed between consecutive receptions.

RSSI: receive signal strength indicator (in dBm).

Sector-level sweep (SLS) phase: A BF training phase that can include as many as four components: an initiator sector sweep (ISS) to train the initiator, a responder sector sweep (RSS) to train the responder link as, an SSW Feedback, and an SSW ACK.

SNR: The received signal to noise ratio (in dB).

SP: scheduled service period; The SP that is scheduled by the access point (AP). Scheduled SPs start at fixed intervals of time.

Spectral efficiency: The information rate that can be transmitted over a given bandwidth in a specific communication system, usually expressed in bits/sec/Hz.

STA: Station; a logical entity that is a singly addressable instance of a medium access control (MAC) and physical layer (PHY) interface to the wireless medium (WM).

Sweep: A sequence of transmissions, separated by a short beamforming interframe space (SBIFS) interval, in which the antenna configuration at the transmitter or receiver is changed between transmissions.

Transmit sector sweep (TXSS): Transmission of multiple Sector Sweep (SSW) or Directional Multi-gigabit (DMG) Beacon frames via different sectors, in which a sweep is performed between consecutive transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
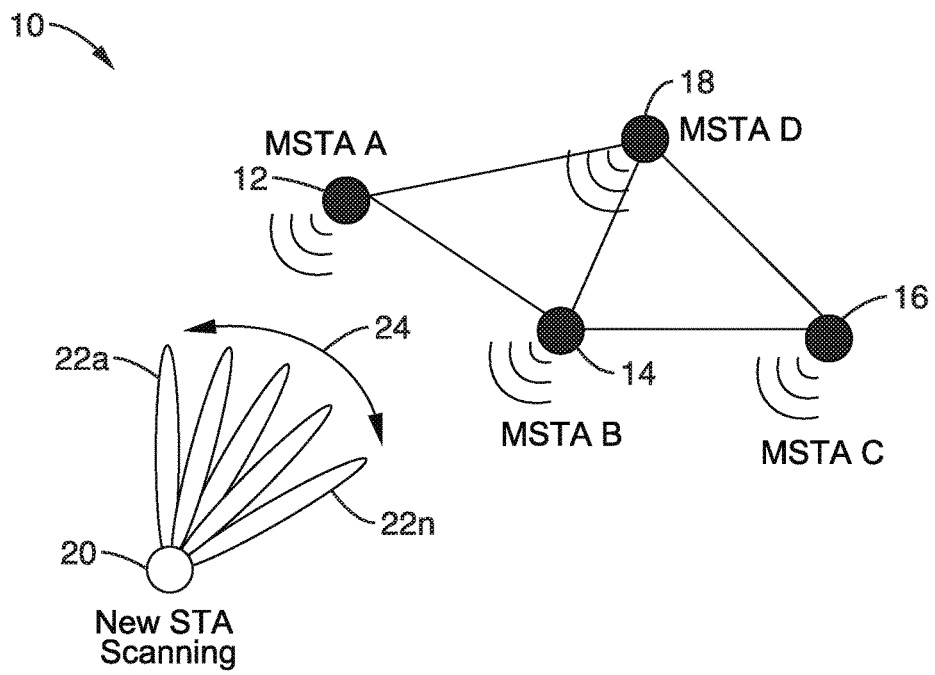
FIG. 1 is an example radio node topology showing station nodes connected in a mesh topology to which a new STA is attempting to join.

1. Introduction to IEEE 802.11s 1.1. WLAN Systems

In WLAN systems under IEEE 802.11 there are two modes of scanning defined: (1) passive scanning, and (2) active scanning.

There are a number of attributes of this known approach to passive scanning. (a) A new STA to a mesh examines each channel and waits for beacon frames for MaxChannelTime. (b) If no beacon is received, the new STA moves to another channel. It saves battery power since new STA does not transmit any signal in scanning mode. The STA should wait enough time at each channel to not miss the beacons. (c) If a beacon is lost, the STA should wait for another BTI.

Similarly, following are some attributes of active scanning. (a) A STA sends Probe Request frames on each channel. The STA moves to a channel, waits for incoming frames or a probe delay timer to expire. If no frame is detected after the timer expires, then the channel is not in use. If the channel is not in use, the STA moves to a new channel. If the channel is in use, the STA gains access to the medium using regular DCF and sends a Probe Request frame. The STA waits for some time (Minimum Channel Time) to receive a response to the probe request if the channel was never busy. The STA waits for more time (Maximum Channel Time) if channel was busy and a probe response was received. (b) A probe Request can use a unique SSID, list of SSIDs or a broadcast SSID. (c) Active scanning is prohibited in some frequency bands. (d) Active scanning can be a source of interference and collision, especially if many new STAs arrive at the same time and are actively seeking to access the network. (e) Active scanning is a faster way for STAs to gain access to the network, compared to passive scanning, since STAs do not need to wait for beacons. (f) In infrastructure BSS and IBSS, at least one STA is awake to receive and respond to probes. (g) STAs in MBSS might not be awake at any point of time to respond. (h) When radio measurement campaigns are active, nodes might not answer the probe requests. (i) Collision of Probe Responses can arise. STAs might coordinate the transmission of probe responses by allowing the STA that transmitted the last beacon to transmit the first Probe Response. Other nodes can follow and use back off times and regular DCF channel access to avoid collision.

1.2. IEEE 802.11s Mesh WLAN

IEEE 802.11s is a standard that adds wireless mesh networking capabilities to the 802.11 standard. The 802.11s standard defines new types of radio stations as well as new signaling to enable mesh network discovery, establishing peer-to-peer connection, and routing of data through the mesh network. Toward optimizing mesh WLAN a mesh network should be considered having a mix of non-mesh STAs connected to Mesh-STA/AP and Mesh STAs connected to other mesh STA including a mesh portal.

Nodes in mesh networks use the same scanning techniques defined in 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network of which the discovered mesh STA is a member and establish a mesh peering with the neighbor mesh STA. The discovered neighbor mesh STA may be considered a candidate peer mesh STA when the mesh STA uses the same mesh profile as indicated by the received Beacon or Probe Response frame for the neighbor mesh STA.

The mesh STA attempts to maintain the discovered neighbor's information in a Mesh Neighbors Table, which according to one embodiment comprises: (1) neighbor MAC address, (2) operating channel number, and (3) most recently observed link status and quality information. If no neighbors are detected, the mesh STA adopts the Mesh ID for its highest priority profile and remains active.

Previous to the present disclosure, all signaling to discover neighbor mesh STAs was performed in broadcast mode, because 802.11s has not been designed and configured for operation on networks providing directional wireless communications.

1.3. Mesh Identification Element

The Mesh Identification Element comprises a number of subfields including the following. The Mesh ID element is used to advertise the identification of a Mesh Network. The Mesh ID is transmitted in a Probe request, by a new STA willing to join a mesh network, and is transmitted in beacons and signaling by existing mesh network STAs. A Mesh ID field of length 0 indicates the wildcard Mesh ID, which is used within a Probe Request frame. A wildcard Mesh ID is a specific ID that prevents non-mesh STA from joining a mesh network.

1.4. Mesh Configuration Element

The Mesh Configuration element is used to advertise mesh services. It is contained in Beacon frames and Probe Response frames transmitted by mesh STAs. The main contents of the Mesh Configuration elements are: (a) path selection protocol identifier, (b) path selection metric identifier, (c) congestion control mode identifier, (d) synchronization method identifier, (e) authentication protocol identifier. The contents of the Mesh Configuration Element together with the Mesh ID form a mesh profile.

The conventional 802.11s standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.5. Millimeter Wave (mm-Wave) in WLAN

WLAN in millimeter wave band requires the use of directional antennas for transmission, reception, or both, to account for the high path loss and provide sufficient SNR for communication. Using a directional antenna in transmission or reception requires that the scanning process become directional as well. IEEE 802.11ad and the new standard 802.11ay define procedures for scanning and beamforming for directional transmission and reception over the millimeter wave band.

1.6. IEEE 802.11ad Scanning and BF Training

An example of a mmWave WLAN state-of-the-art system is the 802.11ad standard.

1.6.1. Scanning

A new STA operates on passive or active scanning mode to scan for a specific SSID, a list of SSIDs or all discovered SSIDs. To passively scan, a STA scans for DMG beacon frames containing the SSID. To actively scan the following steps are performed: (1) a DMG STA transmits Probe Request frames containing the desired SSID or one or more SSID List elements, (2) a DMG STA might also have to transmit DMG Beacon frames or perform beamforming training prior to the transmission of Probe Request frames.

1.6.2. BF Training

BF training is a bidirectional sequence of BF training frame transmissions that use sector sweep and provide the necessary signaling to allow each STA to determine appropriate antenna system settings for both transmission and reception.

802.11ad BF training process can be performed in phases. (a) Sector level sweep phase whereby directional transmission with low gain (quasi-omni) reception is performed for link acquisition. (b) Refinement stage that adds receive gain and final adjustment for combined transmit and receive. (c) Tracking during data transmission to adjust for channel changes.

1.6.3. 802.11ad SLS BF Training Phase

The following section focuses on the sector level sweep (SLS) mandatory phase of the 802.11ad standard. During SLS, a pair of STAs exchanges a series of sector sweep (SSW) frames (or beacons in case of transmit sector training at the PCP/AP) over different antenna sectors to find the one providing the highest signal quality. The station that transmits first is called the initiator, the second is the responder. During a transmit sector sweep (TXSS), SSW frames are transmitted on different sectors while the pairing node (the responder) receives with a quasi-Omni directional pattern. The responder determines the antenna array sector from the initiator which provided the best link quality (e.g., signal-to-noise ratio (SNR)).

Consider the example of a beamformed directional transmitter as STA 1 and an quasi-omni-directional antenna as STA 2 performing SSW in 802.11ad. STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

The following considers signaling of the SLS protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Fields for the sector sweep frame (SSW frame) comprise: frame control, duration, RA, TA, SSW feedback and FCS as utilized in the 802.11ad standard. The Duration field is set to the time until the end of the SSW frame transmission. The RA field contains the MAC address of the STA that is the intended receiver of the sector sweep. The TA field contains the MAC address of the transmitter STA of the sector sweep frame.

The SSW field contains subfields Direction, CDOWN, Sector ID, DMG Antenna ID, RXSS Length. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

The SSW feedback field differs depending on whether it is used as part of an ISS. In particular, when transmitted as part of an ISS the SSW feedback field contains the subfields Total sectors in ISS, number of RX DMG antennas, reserved, poll required, and reserved. The Total Sectors in the ISS field indicate the total number of sectors that the initiator uses in the ISS. The Number of RX DMG Antennas subfield indicates the number of receive DMG antennas the initiator uses during a subsequent Receive Sector Sweep (RSS).

Another form of SSW feedback field it utilized when not transmitted as part of an ISS, and it comprises subfields for Sector Select, DMG antenna select, SNR report, Poll required, and reserved. The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

2. Issues with IEEE 802.11 Mesh Frames

Using mmW in 802.11 mesh frames provides many challenges in the processes of initial access, scanning, and neighbor discovery. The use of directional antennas in the MSTA, or the new STA, or both, adds complexity to the scanning procedure and neighbor discovery. Both active and passive scanning have pros and cons in directional transmission mesh.

2.1. Passive Scanning

MSTAs have to transmit beacons in all directions if beacons are transmitted directionally. Thus, a new STA has to listen in all directions if beacon reception is directional. If it is required for all neighboring MSTAs to be discovered for routing purposes, a new STA needs to scan across many BTIs. This will take a lot of time and power across the network. Nodes in sleeping mode (light or deep) will enforce longer waiting times for beacons to be detected. However, passive scanning achieves power saving and eliminates interference in networks, especially when medium access is controlled.

2.2. Active Scanning

Beamforming training might need to be performed first before a probe request is sent. If beamforming is not performed, a Probe Request has to be transmitted in all directions in each channel if the new STA is using directional transmission. If the Probe request is transmitted using Omni or a Quasi Omni antennas or if the reception on the MSTAs sides is restricted to be directional, then other MSTAs are monitoring all directions for possible probe request transmissions. Transmission of probe requests on all channels and in all directions can flood the network with frames and cause unexpected interference especially when the medium access is controlled and scheduled. However, active scanning is a faster way to connect to the network and inform multiple MSTAs of the new STA existence at once.

Whether passive or active scanning is used, a new STA will consume a lot of time and resources to discover all the neighbors in the mesh network. Directional mesh network nodes require a robust, efficient and fast procedure to discover all neighboring nodes.

3. Benefits of the Present Disclosure

The disclosed apparatus and method uses the already established mesh to help a new node in finding other neighbors. Once the new STA discovers one neighbor, this MSTA should communicate with the other mesh nodes to assist the new STA. This assistance can be triggered through a formal message to nodes in the geographical domain of the discovered node or by eavesdropping on the MSTA message by the new STA. This form of assistance depends on the initial scanning mode being utilized by the new STA.

New STAs scanning to discover neighbors do not need to wait for beacons from neighboring nodes and scan all directions after discovering one MSTA in case of passive scanning. New STAs scanning to discover neighbors do not need to keep transmitting probe request messages in all directions after discovering one MSTA in case of active scanning.

4. Embodiment of the Present Disclosure

FIG. 1 illustrates an example network 10 of mmW wireless nodes where MSTA nodes are connected in a mesh topology with each other. In the current example, stations MSTA A 12, MSTA B 14, MSTA C 16, MSTD 18, and new STA 20 are shown sweeping 24 through transmission/reception directions 22a through 22n. In this example, a new STA is scanning the medium for potential neighboring MSTA and pair nodes. Directional transmission or reception is not needed all the time at both sides. One side might be using direction transmission and/or reception and the other does not. This might arise due to limited capabilities of devices or the application requirement where there is no need for directional transmission from both sides (limiting interference/small distance). A new node can use Omni/Quasi Omni directional or directional antennas for transmission and reception. MSTAs can use Omni/Quasi Omni directional or directional antennas for transmission and reception.

At least one node MSTA, or the new STA, should be utilizing directional antennas to provide enough gain to account for the path loss and provide enough SNR for the link. The new STA scans for neighbors using either passive or active scanning, and according to at least one embodiment, continues scanning until it finds all neighboring nodes. After the list of available neighbors is constructed, a decision about which neighbor(s) to connect to is made. This decision takes into account application demands, traffic loading in the network and wireless channel status.

4.1. STA Hardware Configuration

Figure 2:
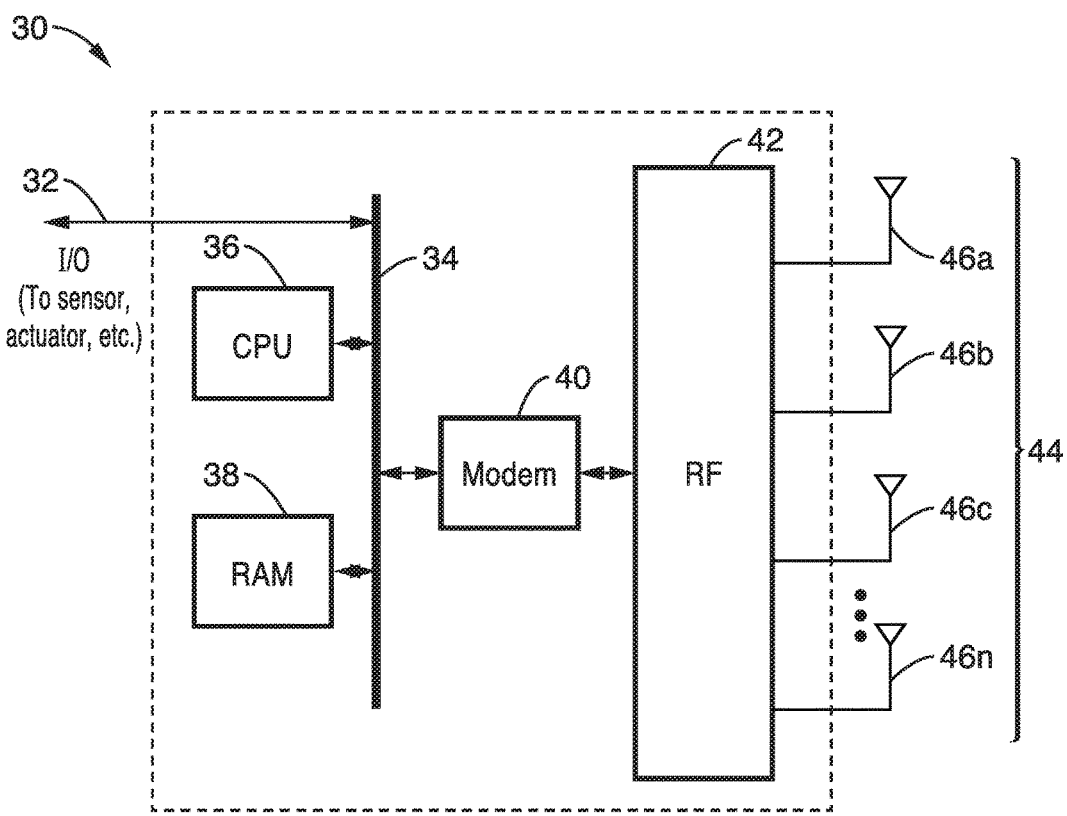
FIG. 2 is a block diagram of station hardware according to an embodiment of the present disclosure.

FIG. 2 illustrates an example embodiment 30 of STA hardware. It will be appreciated that each STA has external I/O 32 for access to applications, CPU and RAM, to run a program that executes (implements) the disclosed communication protocols. I/O line 32 is shown coupled to a bus 34 which connected to a CPU (processing element) 36, RAM (memory) 38 and a communications modulator/demodulator (Modem) 40. The Modem transmit/receive data frames through an RF circuit 42 coupled to antennas 44, exemplified as antennas 46a through 46n, with neighboring STAs. It will be appreciated that multiple RF circuits may be utilized in the present disclosure with associated antennas oriented in other regions. The Modem is connected to the RF module to generate and receive physical signals. The RF module comprises a frequency converter, array antenna controller, and other circuits directed to the communication application. The RF module is coupled to multiple antennas 44, shown by way of example as antennas 46a through 46n, which are controlled to perform beamforming for transmission and reception. In this way, the STA transmits signals using multiple sets of beam patterns.

Figure 3:
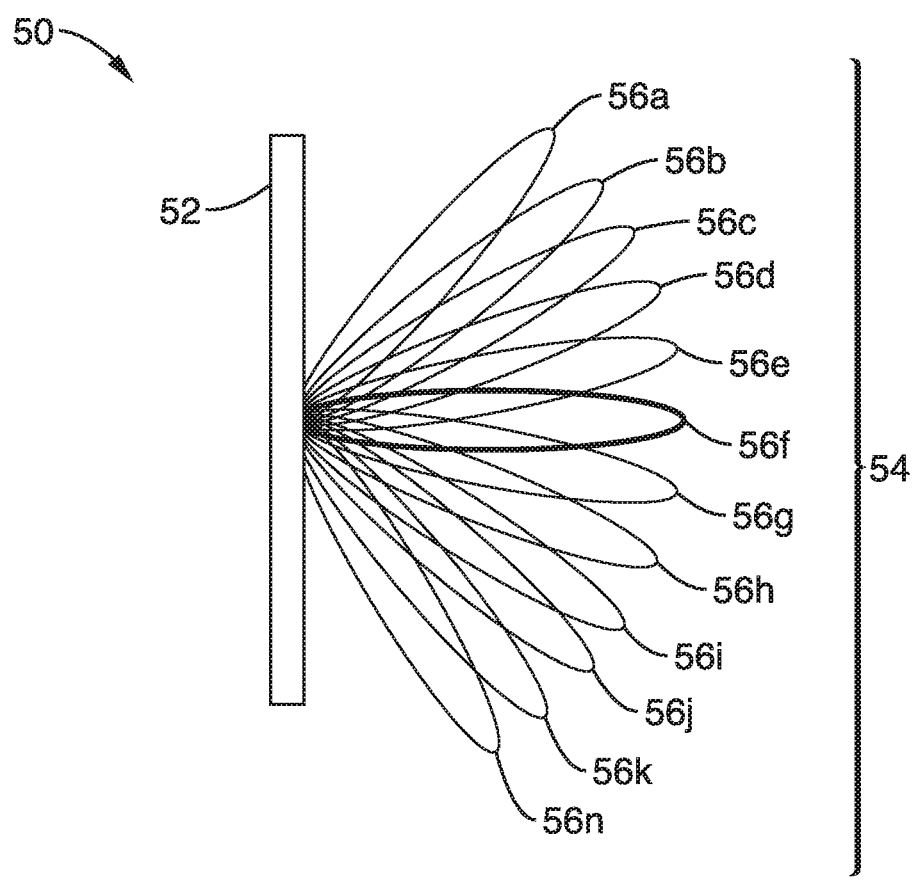
FIG. 3 is a beam pattern map of directional transmission in a general direction according to an embodiment of the present disclosure.

FIG. 3 depicts an example beam pattern 50 from an RF-antenna section 52, each direction of which is termed an antenna sector, shown as 56a through 56n. By way of example and not limitation, the STA generates 12 beamforming patterns, which is termed as the STA having 12 antenna sectors. However, for the sake of simplicity of description, the discussion often assumes all STAs have four antenna sectors. it should be appreciated that any arbitrary beam pattern can be mapped to an antenna sector according to embodiments of the present disclosure. Typically, the beam pattern is formed to generate a sharp beam, but it is possible that the beam pattern is generated to transmit or receive signals from multiple angles.

4.2. Mesh Discovery Assistance and Network Procedure

Figure 4:
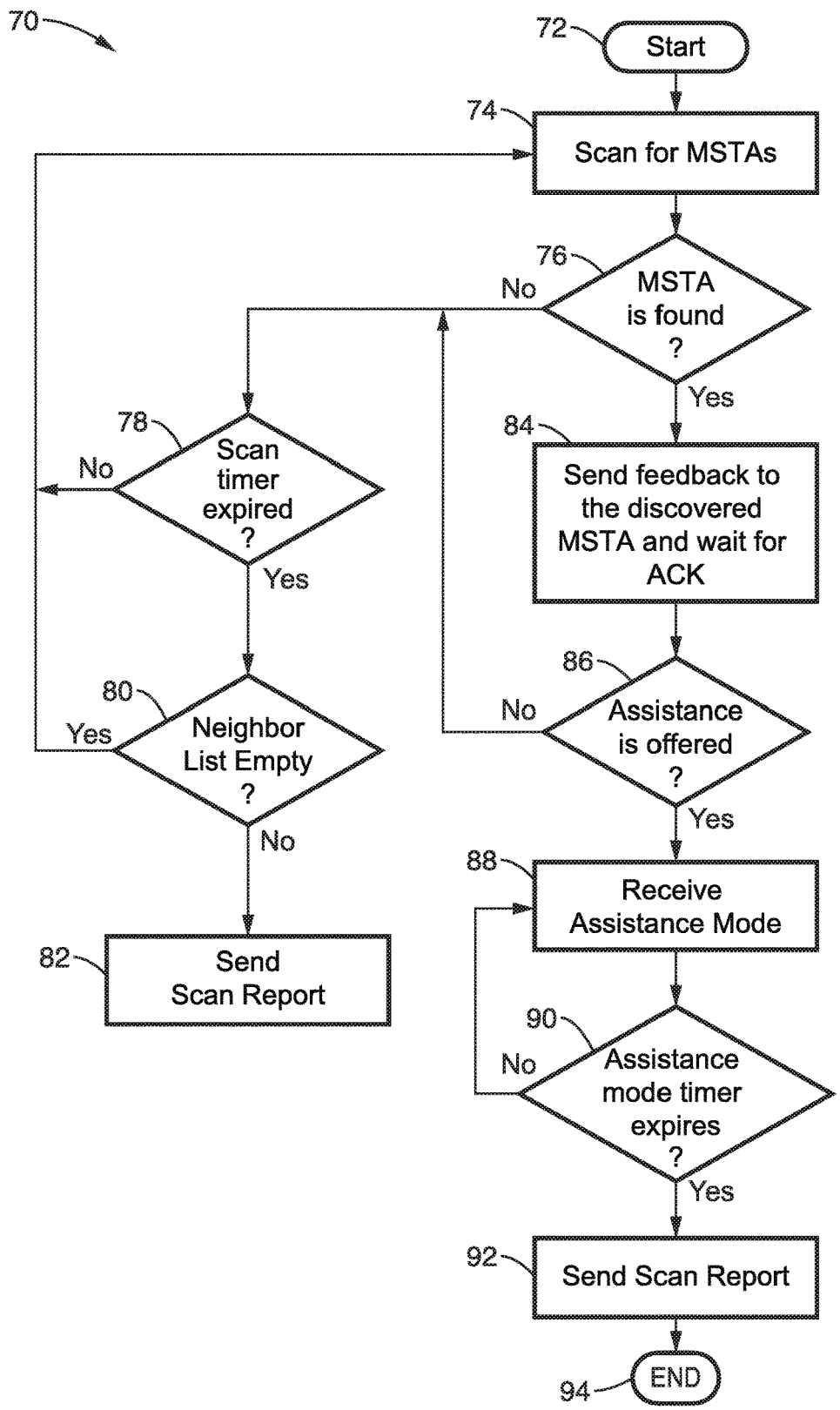
FIG. 4 is a flow diagram of a discovery assistance process utilized according to an embodiment of the present disclosure.

FIG. 4 illustrates an example embodiment 70 overviewing the discovery assistance procedure. The routine commences 72 with the new STA starting scanning 74 for a mesh STA (MSTA). If an MSTA is not found in the scan, then a check is made if the scan time has expired 78. If it has not expired then another scan 74 is performed. Otherwise, a check is made 80 to determine if the neighbor list is empty. If it is empty, then block 74 is executed for perform another scan. Otherwise, if the timer scan has expired, and the neighbor list is not empty, then a scan report is sent 82. Returning back to block 76, if an MSTA is found, then execution moves to block 84 with the sending of feedback to the discovered MSTA, and then it waits for the ACK. A check is made at block 86 to determine if assistance is offered. If assistance is not offered, then execution returns to block 78. If assistance is offered from the MSTA, then execution moves to block 88 with the new STA entering into a mode to receive assistance. Assistance is sought with checks made 90 on an assistance mode timer. If the assistance mode timer has not expired then execution returns to block 88 to receive assistance mode, such as from another MSTA, otherwise block 92 is reached with a scan report being sent 92 prior to ending 94 the routine.

Thus, as seen from the flow diagram, once the new STA discovers a MSTA through scanning, a feedback signal (or frame) is sent from the new STA to this MSTA to inform this MSTA about the new STA existence. The discovered MSTA informs other MSTAs in the same geographical area of the mesh network that a new STA trying to discover more neighbors. The new STA switches from scanning mode to waiting for assistance mode.

In the same time frame that the new STA is finding and getting assistance from an MSTA, other MSTAs in the geographical area of the new STA start providing assistance for a specific time. Once the new node discovers a new neighbor, it sends a feedback to this MSTA and that discovered MSTA gets out of the assistance mode and returns to normal mode. If the MSTA did not get feedback from the new STA for a specific amount of time, the MSTA gets out of the assistance mode and switches back to normal mode.

However, if the new node did not find any new node, such as within a minimum channel time (min-channel-time), the new STA switches back to regular scan mode.

If the new node finds an MSTA during the receive assistance mode, it keeps searching for an MSTA within a boundary threshold, such as for a given length of time (e.g., max_channel_time), or a given number of tries. If nothing else is found, the new STA node exits scan mode and sends a scan report, such as comprising a list of all neighbors discovered sent from the MAC to a higher entity (central of inside the node) to make decisions about the neighbor selection, scheduling and routing.

Figure 5A:
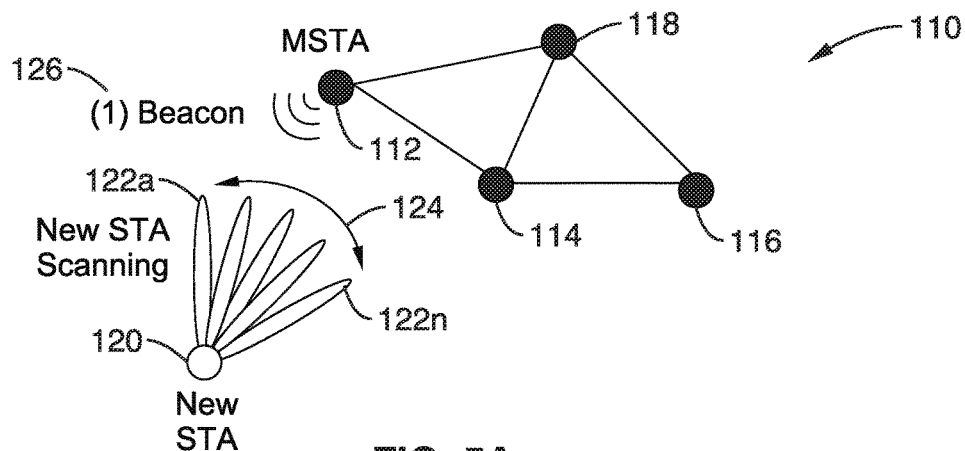
FIG. 5A through FIG. 5C are an example mesh network showing operation according to an embodiment of the present disclosure.
Figure 5B:
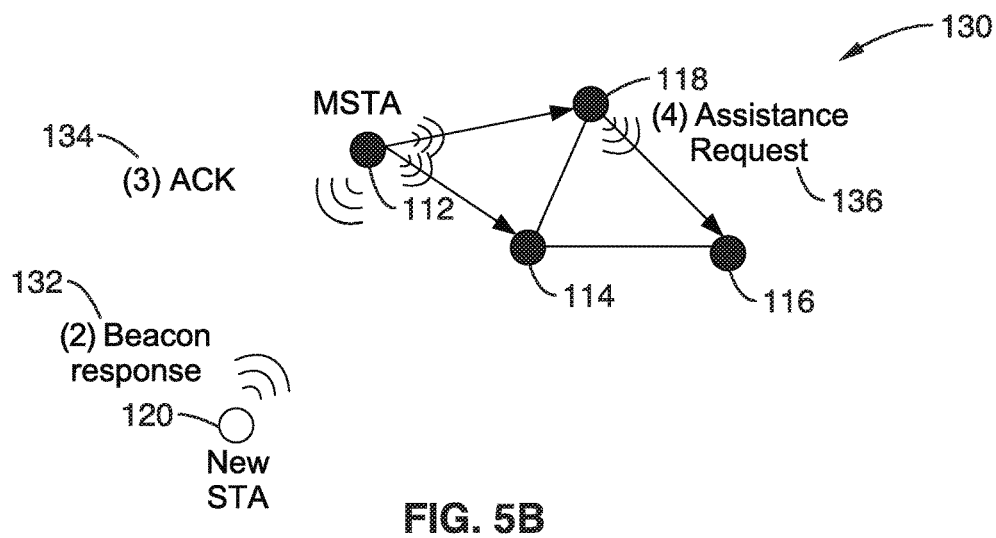
Figure 5C:
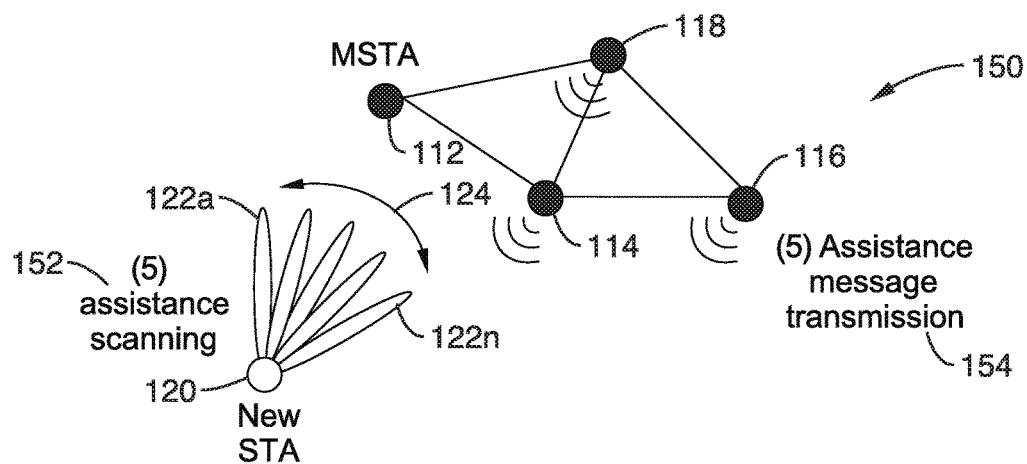

FIG. 5A through FIG. 5C illustrate an example scenario 110, 130, 150 of disclosed mesh assisted discovery in an example of passive mode scanning. The figure shows a new node 120 and neighboring nodes represented as nodes 114, 116 and 118.

In FIG. 5A a new node 120 is actively or passively scanning for neighboring nodes, which are represented as MSTA 112 along with MSTA (mesh STA) nodes 114, 116 and 118. In a first step (1) MSTAs in the mesh are sending beacons (Beacon) 126 and the new node is scanning for beacons. This scanning can be performed utilizing an active scanning in which the new node is sending a DMG beacon or a probe request. Scanning 124 by the new node is seen performed across multiple directions 122a through 122n.

In FIG. 5B, once an MSTA is discovered, the new STA 120 sends a (2) beacon response (Beacon response) 132 to the discovered MSTA to inform the discovered MSTA of the existence of the new node and ask for mesh discovery assistance. The MSTA replies to the new STA by sending (3) an acknowledgement (ACK) 134 and indicating the capability of the mesh to help in discovery. All nodes in the geographical discovery set are informed through an assistance request control message (4) (Assistance Request) 136 sent through the mesh to all MSTAs in the MSTA/MSTA sector geographical discovery set. The MSTAs are expected to assist the new node and facilitate the discovery process.

In FIG. 5C the MSTA, or MSTA sectors, in the geographical discovery set of the discovered MSTA sector, send assistance messages (5a) 154 to the new node, while the new STA is expecting these messages and will be scanning (5b) the medium for them.

4.3. Geographical Discovery Zone

A geographical cluster of nodes are created for each MSTA or MSTA sector. For each node sector, the area where this sector is covering represents the foot print of this sector. A set of possible neighboring nodes, or node sectors that can be discovered in the foot print of this sector, comprise a geographical discovery node/sector set, which contains nodes or sectors that might be seen by any new node discovered by, or within, this sector. Not all of the members of this set should be discovered by the new node, but it represents all possible potential neighbors. This set should be updated any time a new node is joining the network to include new MSTAs joining. This set can be constructed either using measurement campaign collection, topology information of the network, or some antenna pattern analysis.

Figure 6:
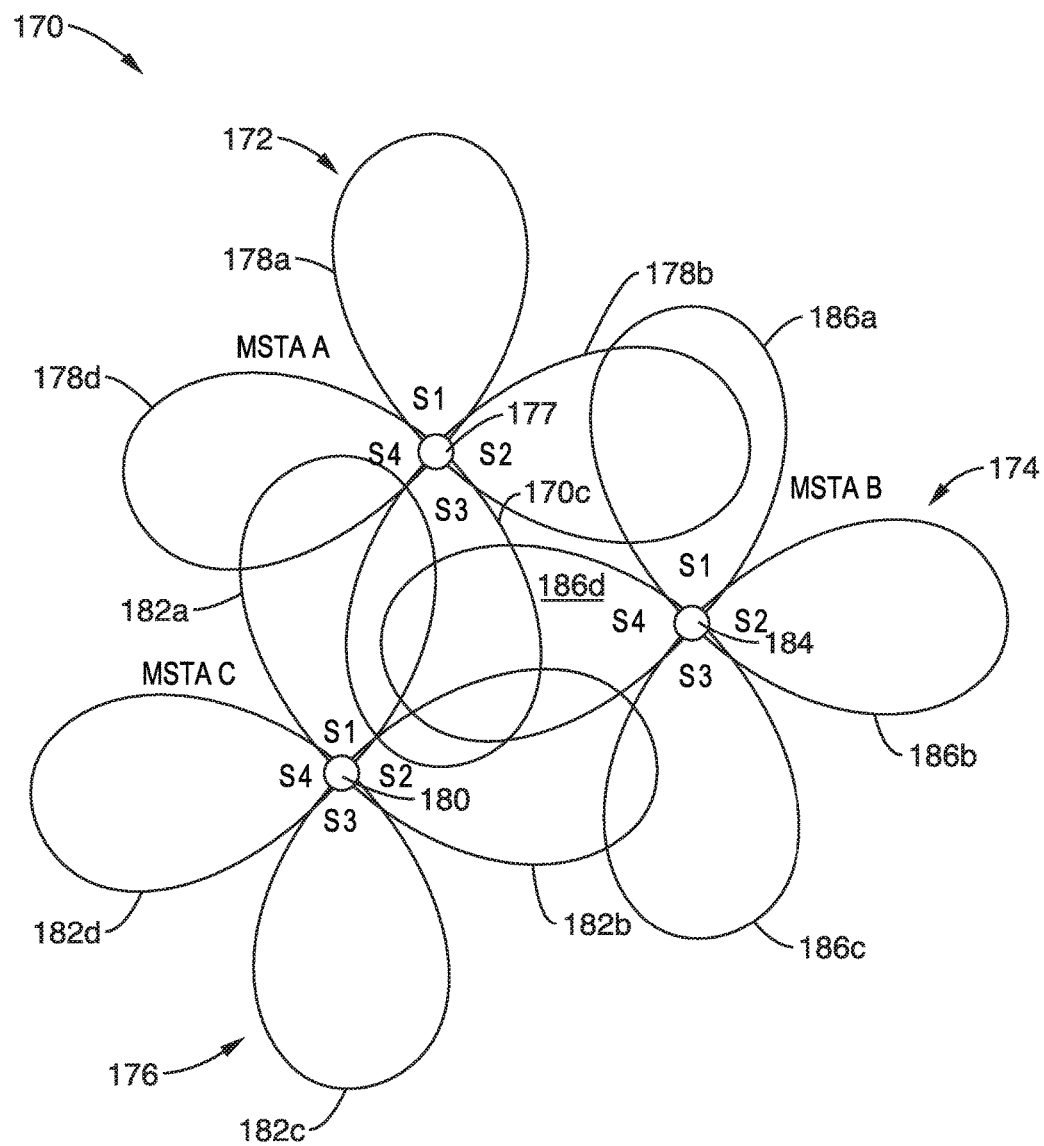
FIG. 6 and FIG. 7 are sector geographical discovery set maps toward aiding in understanding the operation of directional transmission according to an embodiment of the present disclosure.

FIG. 6 illustrates MSTA sector geographical discovery set 170. In the figure is seen MSTA A 116 having discovery sets 172 comprising set S1 178a, set S2 178b, set S3 178c, and set S4 178d. MSTA B 184 has multiple discovery sets 174 comprising set S1 186a, set S2 186b, set S3 186c, and set S4 186d. MSTA C 180 has multiple discovery sets 176 comprising set S1 182a, set S2 182b, set S3 182c, and set S4 182d. It will be appreciated that only four discovery sets are depicted in the example for the sake of convenience of illustration and description, although the multiple sector sets of the present disclosure can comprise any desired number.

In this example scenario, and the transmission patterns depicted, any node discovered by MSTA A, Sector 3 (S3) can have MSTA C S1, MSTA C S2 and/or MSTA B S4 as neighbors as well. Any node discovered by MSTA B S1, MSTA S2 will be the only potential neighbor. In at least one embodiment of the disclosure the formation of the geographical discovery zones is performed in response to reporting measurements of the network or using a form of analytical cell planning.

By way of example and not limitation, one embodiment of analytical cell planning is based on estimating what the potential neighbors are at each coverage area of a node's sector and loading the list at the node sector. Any desired procedure can be utilized to generate this list through measurement reporting, for example by utilizing a centralized or distributed procedure. In at least one embodiment, each node and/or sector maintains a list of neighboring nodes and/or sectors that can be discovered by this node/sector. In at least one embodiment, these lists are processed collectively to form relationships between them. The outcome provides an estimate for each sector of what the potential neighbors are if that sector is discovered.

The more nodes that exist in the network, the more accurate the estimate of the discovery zones will be. Also in at least one embodiment, as nodes are moving and discovering new nodes, an update is sent with a new set of nodes and/or sectors that can be discovered. Mobile nodes are being discovered while other nodes are lost sight of, while new lists of neighbors that can be seen simultaneously are being regularly formed, saved and periodically processed.

In a centralized procedure, nodes send these neighborhood lists for each sector to a central entity, which collects all lists from all network nodes and forms the geographical discovery zone. The central entity sends a geographical discovery zone set to each node after processing the collected lists. In at least one embodiment, the nodes send a report of all lists collected over a period of time, periodically or momentarily, once the neighboring list changes to update the network information.

In the distributed procedure, nodes send each of these lists to all members of these lists. In this example case, the list is preferably sent closely following the list being updated to all members of the list before the node loses sight of any of the list members. Once a node receives a list from another node, it adds all the members of the list to the discovery zone of the sector that it was received from.

Figure 7:
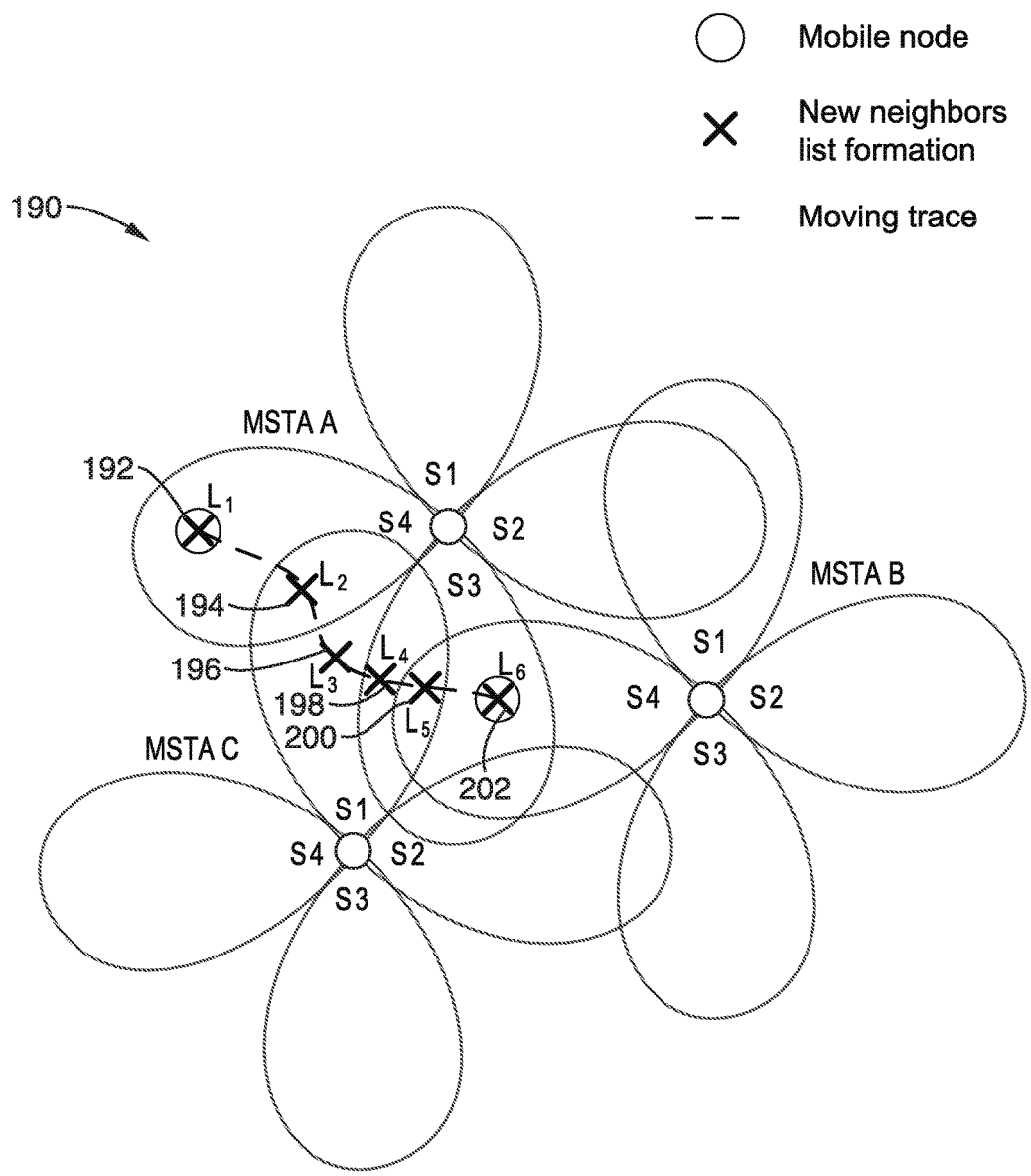

FIG. 7 depicts the lists being superimposed on the MSTA sector geographical discovery set as was seen in FIG. 6, and in new FIG. 7 depicts an example of a node moving and forming new lists 190, depicted as list 1 (L1) 192, list 2 (L2) 194, list 3 (L3) 196, list 4 (L4) 198, list 5 (L5) 200, and list 6 (L6) 202 as the node moves and forms new neighbor associations and loses other neighbors as it moves in relation to the other mesh stations. It will be appreciated that for the sake of simplicity of illustration, only the one node is shown moving, wherein the present disclosure is configured to update the neighbor associations even if every one of the STA nodes is moving in relation to one another. These lists are used to update the geographical discovery zone set for these neighbors as shown in Table 1A and Table 1 B.

4.4. Node Procedures 4.4.1. New Node Assistance Scanning Mode

Figure 8A:
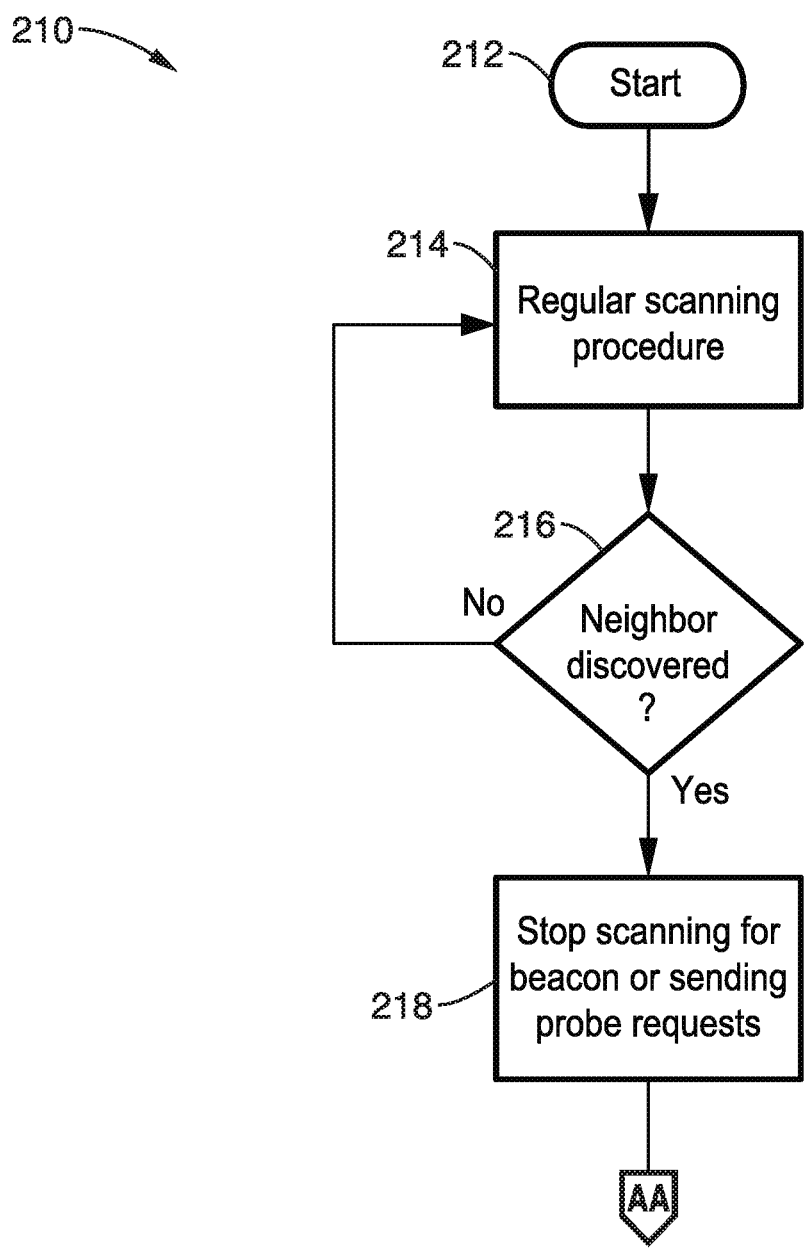
FIG. 8A and FIG. 8B are a flow diagram of obtaining MSTA assistance according to an embodiment of the present disclosure.
Figure 8B:
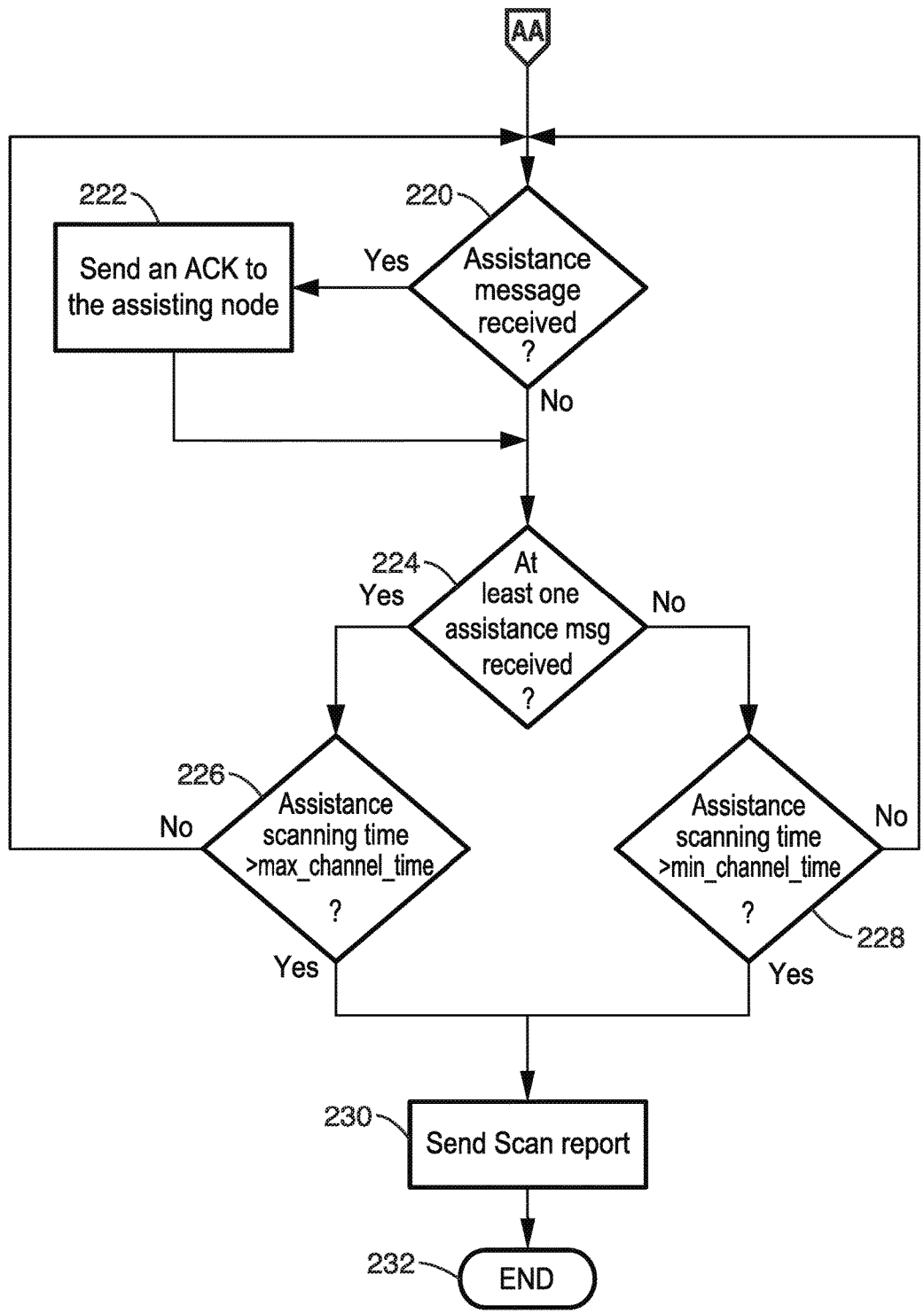

FIG. 8A and FIG. 8B illustrate an example embodiment 210 of an MSTA assistance process. In this example, the process starts 212 in FIG. 8A with regular scanning performed 214 followed by a check 216 to determine if a neighbor is discovered. If no neighbor is discovered, then a return is made to block 214 for scanning. Otherwise, with a neighbor discovered, block 218 is executed to stop scanning for beacons or the sending of probe requests, after which block 220 is reached in FIG. 8B to determine if an assistance message was received. Thus it will be appreciated that the new node waits for nearby nodes to reach out to it, which is a switch from active scanning for new neighbors to passive scanning for new neighbors once one neighbor is discovered. If an assistance message received, then it is acknowledged (ACK) in block 222. In either case, (from block 220 or block 222) execution reaches block 224 to check if at least one assistance message was received. If true, then a check is made 226 if the assistance scanning time has exceeded the maximum channel time (max_channel_time). If this threshold is not exceeded, then execution returns back to decision block 220. Similarly, if from block 224, no assistance messages were received then block 228 determines if the assistance scanning time has exceeded the minimum channel time (min_channel_time). Again, if this threshold is not exceeded, then execution returns to decision block 220. If either of the above thresholds is exceeded, then execution reaches block 230 and a scan report is sent with the process ending at block 232.

Thus, it is seen above that once the new STA discovers one MSTA, it stops its regular scanning procedure and: (1) the new node stops scanning for DMG beacons if it is using passive scanning; and (2) the new node stops sending Probe Requests/DMG beacons if it is using active scanning.

The new node listens in receiving mode for an assistance message from MSTAs in the network. The assistance message can be in the form of a probe response. If the new node finds a DMG beacon, the new node is configured to process it and carry on any beamforming training as needed. If the new STA receives an assistance message, it is configured to send an acknowledgement message to the MSTA offering this assistance. If the new node did not receive any assistance message or any beacon, such as within a given period of time (e.g., after min_channel_time) or bounded by an event (i.e., number of tries, interrupt, etc.), then the new node considers the scan for this mesh basic service set (MBSS) complete and the discovered MSTA is the only neighbor available. If the new node receives any assistance message or any beacon, the new node stays in the assistance scanning mode for a period of time, for instance the max_channel_time time period. In this example, after the timer expires, a scan report is sent to the management entity.

4.4.2. MSTA Assistance Procedure

Figure 9:
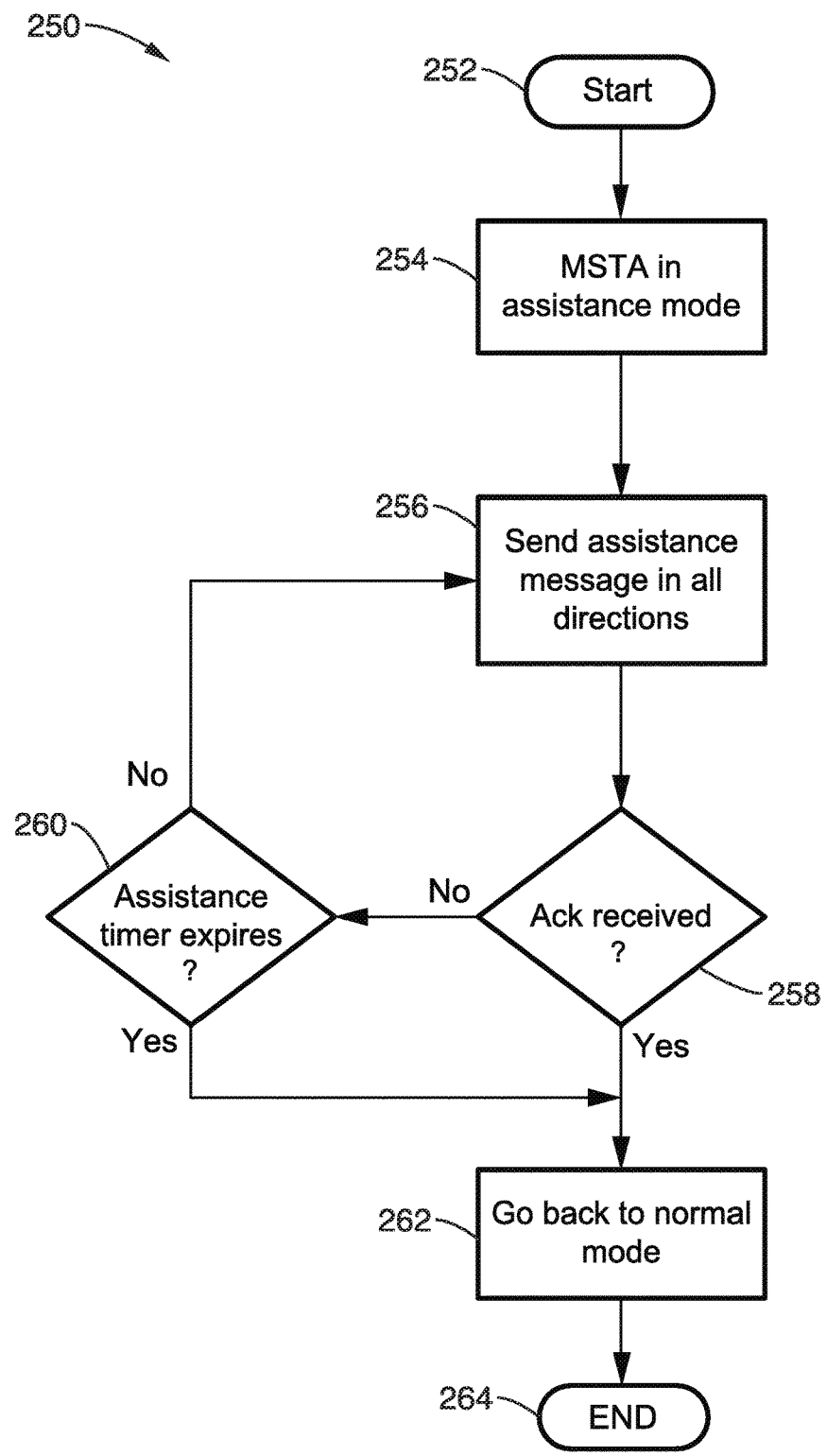
FIG. 9 is a flow diagram of providing MSTA assistance according to an embodiment of the present disclosure.

FIG. 9 illustrates an example embodiment 250 of an MSTA assistance process. In at least one embodiment, an MSTA offers assistance by unicasting a message to the new STA with its capabilities and ID. The new STA does not need to search for a beacon that is sent every BTI and is configured to wait for a full beacon interval if a beacon is lost or not received.

In the figure, the process starts 252 and the MSTA enters into assistance mode 254 then sends assistance messages in all directions 256. Decision block 258 is reached which determines if an ACK is received. If the ACK is received, then this indicates that assistance was received, whereby block 262 is executed for the MSTA to return 262 to normal operating mode, and the process ends. Otherwise, without receiving an ACK, execution moves to decision block 260 to check an assistance time out. It will be appreciated that this threshold may comprise a time value, number of tries, or other events used as an assistance threshold. In particular, if the amount of time to provide assistance has not expired, then execution returns to block 256 to again send assistance messages, otherwise the MSTA has spent sufficient time trying (exits assistance mode) and execution reaches block 262 where it returns to normal mode and the process ends 264.

It will be noted from the above, that the MSTA might iterate the transmission of this message (probe response for example) in all directions for a specific amount of time to assure it will be received by the new node if it is in range. If the MSTA assistance message is received, the new STA is configured to send an acknowledgement and the MSTA is configured to terminate its assistance offering mode.

If the MSTA assistance message is never received by the new STA after many transmission cycles in all supported directions, then in at least one embodiment, the MSTA will assume that the new STA is out of its range, or not responding, and will terminate assistance mode. It will be appreciated that the new STA is configured so that it can still discover the MSTA later if it receives its beacon.

It should be noted that in at least one embodiment, the MSTA assistance procedure depends on the type of antenna it is using, Omni/quasi Omni or directional antenna. The following describes two separate procedures for the MSTA assistance depending on the type of transmit and receive antenna used at the MSTA as follows:

4.4.2.1. Omni/Quasi Omni Antenna Mesh Node Assistant

Figure 10:
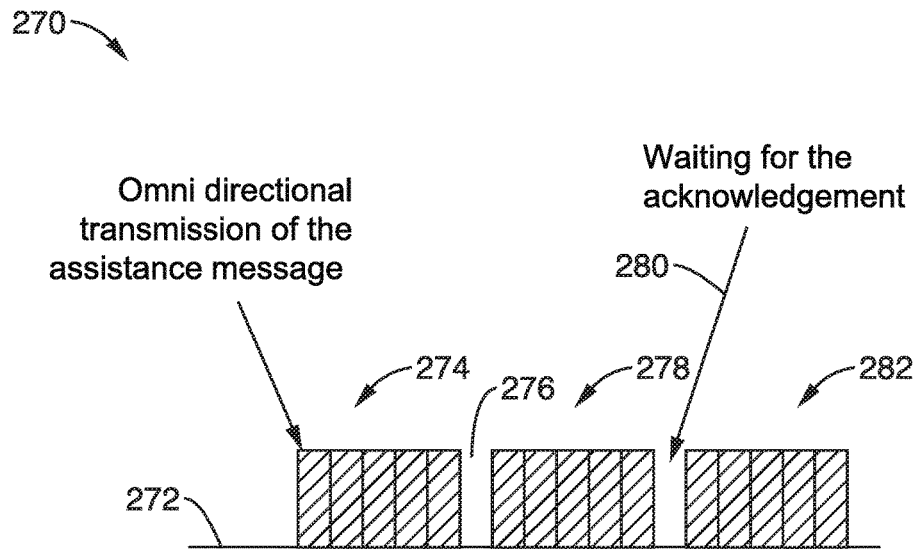
FIG. 10 is a timeline diagram of omni/quasi-omni antenna mesh node assistance as utilized according to an embodiment of the present disclosure.

FIG. 10 illustrates an example embodiment 270 of omni/quasi-omni antenna mesh node assistance along a timeline 272. The MSTA is informed about a new node trying to discover neighboring nodes and their capabilities.

The MSTA is informed about the new STA ID and number of the new STA scanning sectors. MSTA repeats 274 transmitting the assistance message (probe response for example) for multiple times, in at least one embodiment for a number of times equal to the number of scanning directions in the new STA, with repeated listening times 276, 280 to obtain feedback. The MSTA listens 276 at the end of the assistance message transmissions for a limited period of time waiting for an acknowledgement from the new STA if any of the repeated versions of the assistance message was received.

If an acknowledgement is received 276, the MSTA exits the assistance mode. If no acknowledgement is received, the MSTA repeats transmitting the assistance message 278 and listens for acknowledgement 280. After a specific number of no acknowledgement receptions, the MSTA is configured to leave (exit) assistance mode and considers the new STA unreachable.

4.4.2.2. Directional Mesh Node Assistance

The following sections define two procedures for directional mesh node assistance.

4.4.2.2.1. Directional Assistance Procedure A

Figure 11:
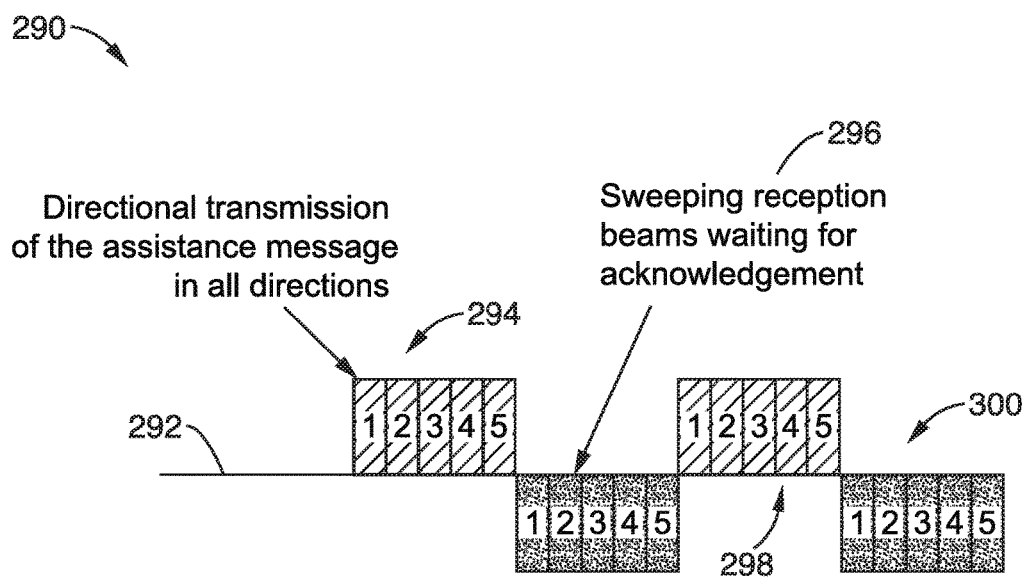
FIG. 11 is a timeline diagram of directional assistance process A according to an embodiment of the present disclosure.

FIG. 11 illustrates an example embodiment 290 of directional assistance process A along timeline 292. The MSTA is informed about a new node trying to discover neighboring nodes and their capabilities. The MSTA is informed about the new STA ID and number of the new STA scanning sectors. MSTA transmits the assistance message (probe response for example) in all directions 294 (e.g., MSTA transmits 5 message in 5 different direction with different beam pointing toward those 5 directions). Beams one to five 294 are used to cover all directions in this example. Right after the transmission of the assistance message in all directions, the STA listens (monitors) 296 in all directions sequentially awaiting an acknowledgment from the new STA if the assistance message was received. If an acknowledgement is received, the MSTA terminates its assistance mode. If no acknowledgement is received, the MSTA repeats transmission in all directions, and transmits 298 the assistance message again and waits 300 for acknowledgment. The MSTA repeats the process multiple times, such as for example for a specific number of number of times. If no acknowledgement is received after a selected threshold (e.g., time or cycles) of transmissions in all directions, the MSTA terminates (exits) assistance mode and considers this new STA unreachable.

4.4.2.2.2. Directional Assistance Procedure B

Figure 12:
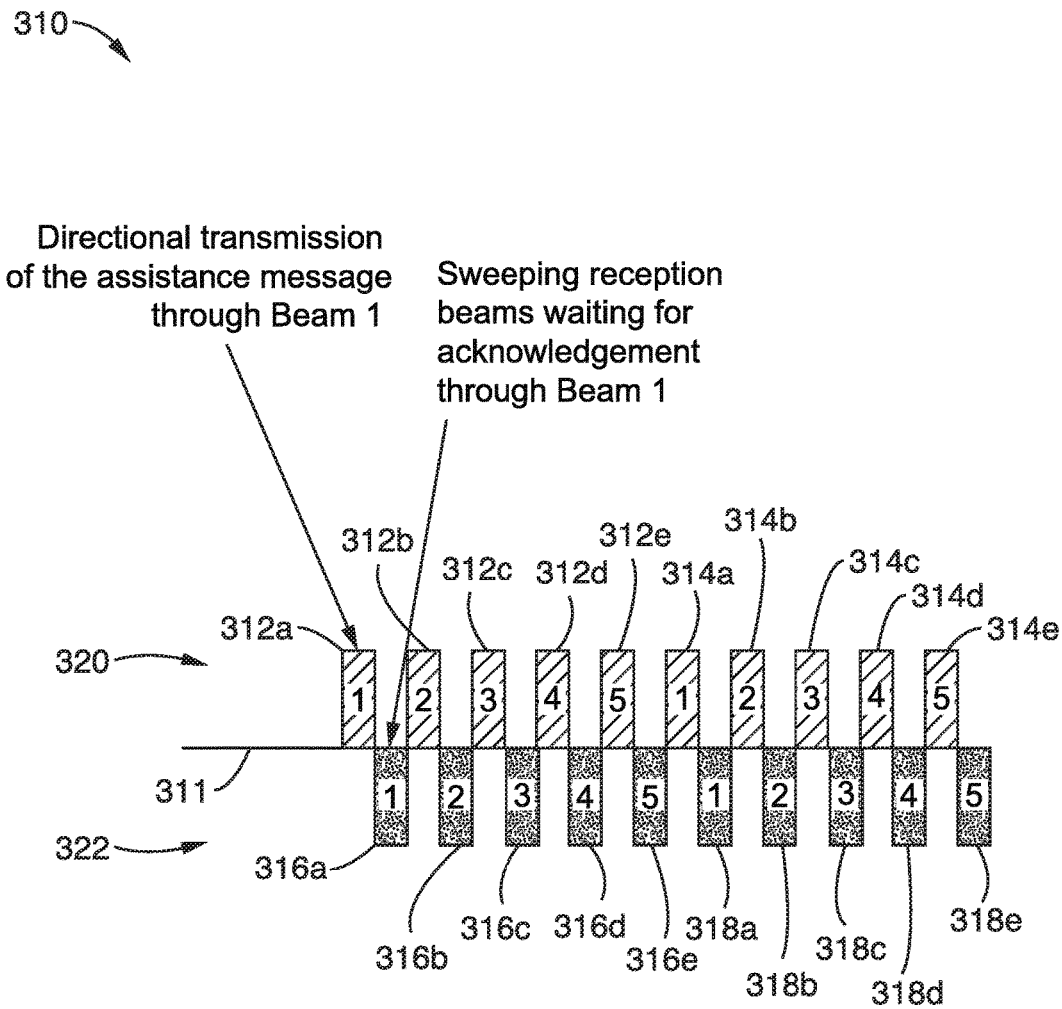
FIG. 12 is a timeline diagram of directional assistance process B according to an embodiment of the present disclosure.

FIG. 12 illustrates an example embodiment 310 of directional assistance process B along timeline 311, showing transmissions 320 and monitoring 322 for acknowledgement. The MSTA receives information that a new node trying to discover neighboring nodes and its capabilities, and receives the new STA ID and number of the new STA scanning sectors. The MSTA transmits the assistance message (probe response for example) in one direction from a specific beam. The acknowledgement is expected right after the transmission of the assistance message. If no Acknowledgment is received, the MSTA transmits the assistance message (probe response for example) in another direction from a different beam and waits (monitors) for acknowledgment. The MSTA tries all directions (beams) as long as (while) no acknowledgment is being received. If an acknowledgement is received, then the MSTA terminates (exits) assistance mode. If no acknowledgement is received after a full sweep, the MSTA repeats the process again, transmitting and listening in all directions. After repeating this process to meet a desired threshold condition (e.g., specific number of repetitions), the MSTA terminates (exits) assistance mode.

4.4.2.2.3. Comparing Procedures A and B

In Procedure A, the new node is configured to listen to all directions prior to sending the acknowledgment, which results in selecting the best transmit sector without the need to transmit multiple acknowledgments.

In Procedure B, the MSTA saves power and time by stopping the assistance message transmission once they are received at the new node. This savings arises because the acknowledgement is sent immediately following the reception of the assistance message. This process also avoids transmission of extra information to the new node with respect to the time of the start of the acknowledgment sweeping period.

However, process B does not provide the opportunity for the new node to listen to all the transmissions and to select the one with the strongest signal conditions (e.g., SNR). The new STA sends an acknowledgement immediately upon receiving a sufficiently usable (power higher than a threshold) assistance message. In response to this acknowledgement the MSTA conclude its assistance phase, whereby the possibility of other sectors providing higher power is not tested. In at least one embodiment, depending on mode, the MSTA determines not to stop transmitting the assistance message even if it receives an acknowledgement; thereby providing an opportunity for the new node to test all transmit sectors. In at least one embodiment, or mode, the new node updates its acknowledgement whenever a better (e.g., more powerful and/or higher SNR) transmit sector is detected, and sends a new acknowledgement.

4.5. Messages Flow

Figure 13:
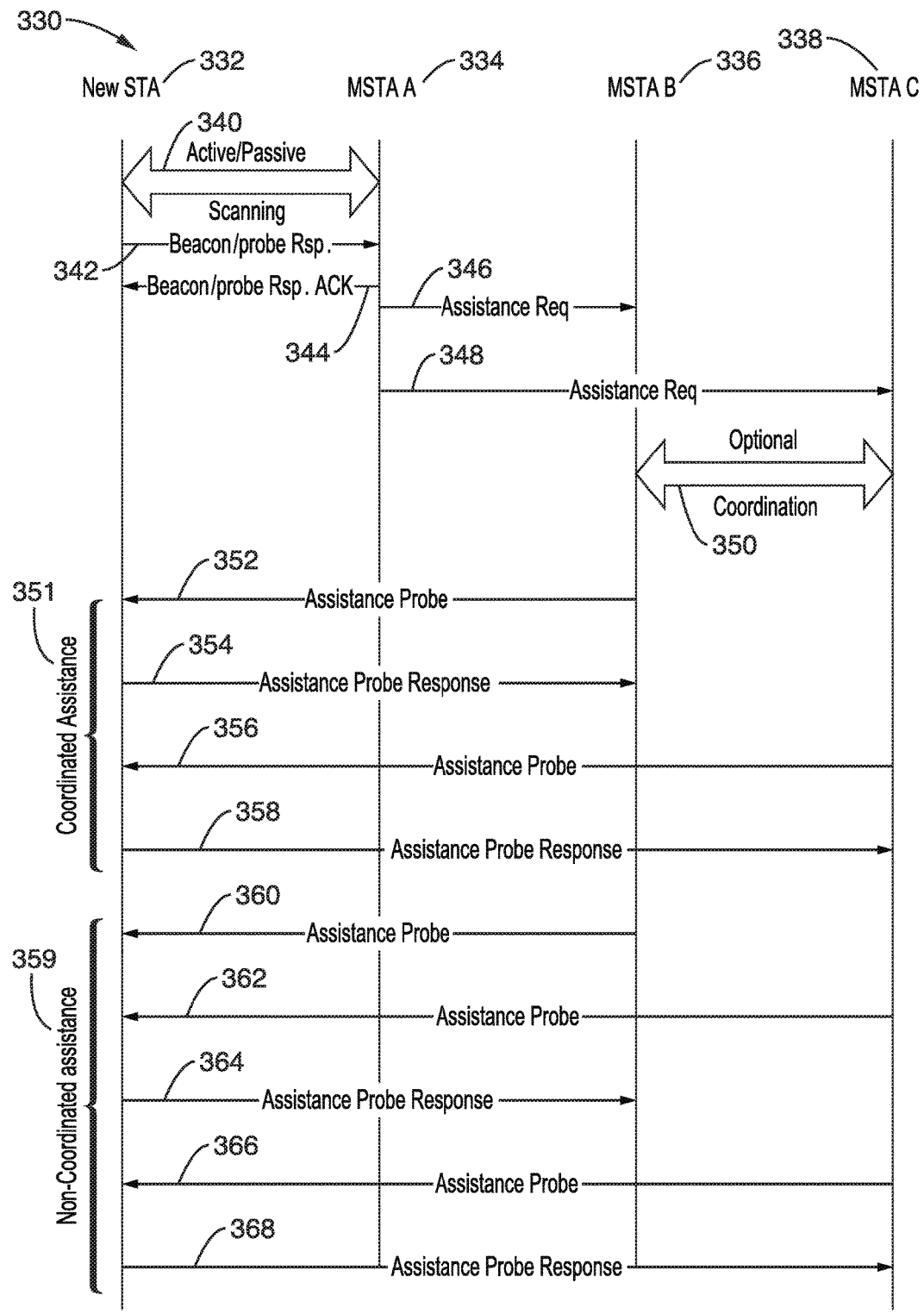
FIG. 13 is a message flow diagram for mesh assisted scanning according to an embodiment of the present disclosure.

FIG. 13 illustrates an example embodiment 330 of message flow for mesh assisted scanning showing message flow between multiple mesh stations, comprising by way of example the new STA 332, MSTA A 334, MSTA B 336 and MSTA C 338, when a new node is scanning the medium and has these three nodes in its discovery range.

The New STA first discovers 340 STA A during active or passive scanning and sends a beacon/probe request 342. STA A (MSTA A) 334 responds with a beacon/probe response ACK 344. STA A is connected to STA B and STA C and forwards 346 an assistance request to MSTA B 336, and forwards 348 another assistance request to MSTA C 338. In at least one embodiment, mode, or node decision, the protocol is configured to provide cooperation (coordination) 350 between mesh nodes (MSTA B and MSTA C) to assist the new node. If the mesh nodes decide on cooperation, then coordinated assistance 351 is provided, with nodes sequentially assisting the new node. Seen in the figure, MSTA B 336 sends an assistance probe 352 to the new node, to which the new node responds with an assistance probe response 354. In a similar manner the other mesh STAs do likewise, and assistance probe 356 is seen from MSTA C 338, with response 358 from the new node.

If cooperation is not selected, the mesh nodes commence transmitting assistance messages concurrently in a non-coordinated form of assistance 359. Every time the new node discovers one mesh node, that mesh node stops transmitting the assistance message and the others keep on transmitting it. In the figure, an assistance probe is seen 360, 362 from MSTA B 336 and MSTA C 338, respectively. The new STA 332 responds to MSTA B 336 with an assistance probe response 364. Another assistance probe 366 is received from MSTA C 338, because it did not receive a response from its previous assistance probe, and this time new STA 332 responds 368 with an assistance probe response.

4.6. Message Formats

4.6.1. Beacon Response

This Beacon Response frame is utilized when a new STA is using passive scanning and discovers a beacon. The new STA sends a beacon response to inform the discovered STA about its existence and the need of assistance. In at least one embodiment, this frame is used for triggering beamforming training.

In at least one embodiment, the frame of an assistance request message comprises the following information.

NSID: an identifier for the new STA to be assisted.

SSID/SSID list: a list of SSIDs the new STA is trying to connect to.

DMG capabilities: new STA supported capabilities.

Mesh ID: Mesh ID element.

Assistance Request: set to True if new STA requesting mesh discovery assistance.

Beamforming training request: indicates whether new STA is requesting beamforming training.

Beacon ID: the MSTA discover beacon ID.

Beam ID: transmit beam ID in case of directional transmission of beacon response message.

Message counter: message counter utilized if frame is transmitted multiple times from Omni/Quasi Omni antenna.

4.6.2. Beacon Response ACK

This Beacon Response ACK message frame is sent from the discovered MSTA to the new STA in situations of passive scanning for confirming reception of the beacon response message and to setup the mesh discovery assistance phase. In at least one embodiment, the frame of a beacon response ACK message comprises the following.

Assistance confirmation: mMesh assistance confirmation.

New STA best transmit beam: the best transmit beam for the new STA if the new STA transmitted the beacon response directionally.

Assistance information: assistance coordination information.

4.6.3. Assistance Request Message

This Assistance Request Message frame is sent from the discovered MSTA to other MSTAs in the mesh network to inform them about the new STA and ask their assistance. In at least one embodiment, the frame of an assistance request message contains the following information.

NSID: identifier of the new STA to be assisted.

SSID/SSID list: list of SSIDs the new STA trying to connect to.

DMG Capabilities: new STA supported capabilities.

Mesh ID: Mesh ID element.

4.6.4. Assistance Message

This Assistance Message frame is sent from an MSTA to the new node offering assistance for faster discovery. The frame is very similar to the WLAN probe response. The frame of an assistance message should contain this information.

Timestamp.

Beacon interval.

DMG Capabilities: MSTA supported capabilities.

NSID: identifier of the new STA to be assisted.

SSID: MSTA SSID.

Beam ID: transmit beam ID in case of directional transmission of assistance message.

Message counter: message counter if frame is transmitted multiple times from Omni/Quasi Omni antenna.

Mesh ID: Mesh ID element.

Mesh Configuration.

4.6.5. Assistance Response

This Assistance Response message confirms the reception of the assistance message by the new node. Once this message is received the MSTA stops the transmission of assistance messages. In at least one embodiment, the frame of an assistance response message comprises the following information.

MSTA best beam ID.

Beam ID: transmit beam ID in case of direction transmission of assistance message.

Message counter: message counter if the frame is transmitted multiple times from a Omni/Quasi Omni antenna.

4.7. Example Scenarios

In the following section a number of example scenarios are considered in a WLAN directional mesh network. (1) The new node is using directional antennas while the MSTAs are using Omni/quasi Omni antennas for transmission and reception. (1)(a) Passive Scanning: beacons are transmitted using Omni/quasi Omni antennas and new STA is scanning using a directional antenna. (1)(b) Active Scanning: Probe Request is transmitted using a directional antenna, MSTAs are receiving using Omni/quasi Omni antennas. (2) The new node is using Omni/quasi Omni directional antennas and the MSTAs are using directional antennas for transmission and reception. (2)(a) Passive Scanning: beacons are transmitted using directional antennas, while the new STA is scanning using an Omni/quasi Omni antenna. (2)(b) Active Scanning: Probe Request is transmitted using an Omni/quasi Omni antenna, and the MSTAs are receiving using directional antennas. (3) The new node is using directional antenna and the MSTAs are using directional antennas for transmission and reception. (3)(a) Passive Scanning: beacons are transmitted using directional antennas, while the new STA is scanning using a directional antenna. (3)(b) Active Scanning: the Probe Request is transmitted using a directional antenna, and the MSTAs are receiving using directional antennas.

In these example scenarios the message exchange is shown for the case where one new STA is scanning the medium to discover multiple (e.g., three) existing mesh nodes. By way of example and not limitation, MSTA A is the node that is discovered first. MSTA B and MSTA C are assisting the new STA in discovery.

4.7.1. Scenario 1

Scenario 1: The new node is using directional antennas and the MSTAs are using Omni/quasi Omni antennas for transmission and reception.

4.7.1.1. Passive Scanning

Figure 14:
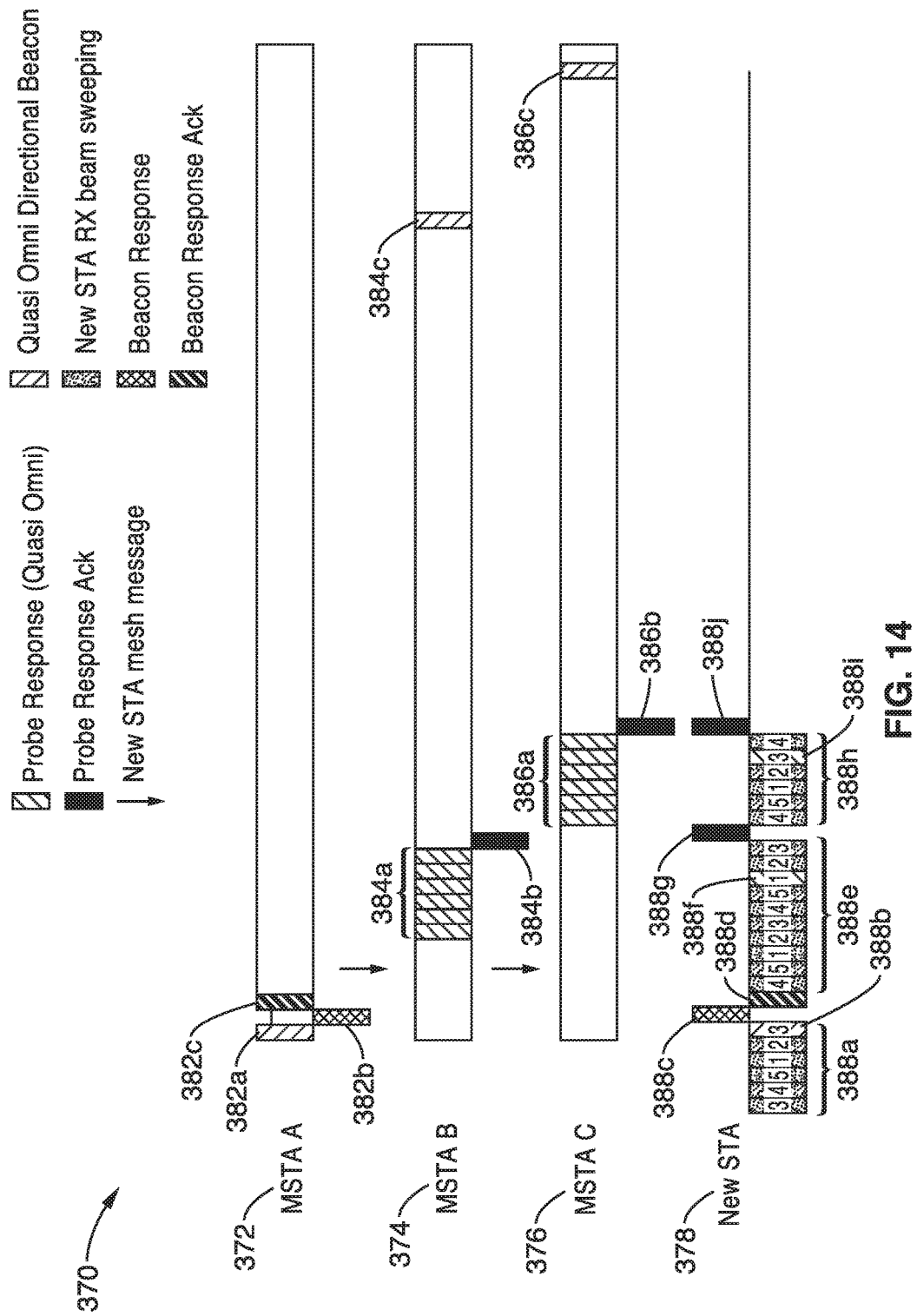
FIG. 14 is a message exchange diagram of a first scenario of directional mesh network under passive scanning according to an embodiment of the present disclosure.

FIG. 14 illustrates an example embodiment 370 of message exchange for Scenario 1 in passive scanning for this scenario. The figure depicts packets above the line as transmitted packets with packets depicted below the line as being received packets. Message time lines are seen in the figure for each of MSTA A 372, MSTA B 374, MSTA C 376, and new STA 378. MSTA A 372, MSTA B 374 and MSTA C 376 are always transmitting and receiving using Omni/Quasi Omni antennas. New STA 378 is always transmitting and receiving using a directional antenna. In passive scanning, beacons are transmitted using Omni/quasi Omni antennas and the new STA is scanning using a directional antenna.

The new STA is seen searching with beam sweeping 388a for beacons in all directions, while MSTAs are transmitting beacons from Omni/quasi-Omni directional antennas. The new STA receives a quasi-omni directional beacon 388b as sent from MSTA A as transmission 382a. Once this beacon 382a is found by the new STA through scanning, the new STA transmits a beacon response 388c which is received 382b by MSTA A which then sends an ACK 382c received by the new STA within directional scanning 388e. The new STA uses the same directional beam it received the beacon from for transmitting beacon response 388c and receiving the beacon response acknowledgement.

The new STA requests mesh assistance within the beacon response. The discovered MSTA informs the new STA of possible MSTA neighbors to discover in the beacon response acknowledgment message. The discovered MSTA informs MSTA neighbors in the same geographical discovery set through direct communication of the existence of a new STA to assist, STA ID and capabilities.

Possible MSTA neighbors alternate transmission of assistance messages to the new STA, such as for a specific period (e.g., governed by a timer), in a quasi-Omni direction with some form of coordination being utilized in at least one embodiment of the disclosure.

The new STA scans 388*e* for assistance messages in all directions. Once an assistance message 388*f* is received by the new STA from Omni/Quasi Omni assistance beacon transmissions 384*a*, then the new STA sends an assistance response message 388*g* back to MSTA B using the same beam utilized for discovering that assistance message, and is received 384*b*. In this case the new STA continues to scan 388*h*, receiving assistance 388*i* from MSTA C in its directional assistance message transmissions 386*a*. In response to receiving the assistance message, the new STA transmits response message 388*j* which is received as 386*b* by MSTA C.

The new STA can use geographical data sent from the discover node to alternate the pattern of beam sweeping to find the assistance message. This pattern of directional sector numbering is depicted in the figure, such as 388*a*, 388*e*, 388*h*, with the numbers (e.g., 3, 4, 5, 1, 2, 3; 4, 5, 1, 2, 3, 4, 5, 1, 2, 3; 4, 5, 1, 2, 3, 4) seen in the small blocks. In at least one embodiment, the pattern of sending assistance messages is a function of beacon transmission time to avoid a loss of time coordinating with other neighboring NSTAs. Although the present disclosure is not limited to how pattern sectoring is numbered or determining the sending of assistance messages. The present disclosure is configured so that MSTAs that are in a light sleep, or even a deep sleep, can be triggered to wake and help assist the new STA, such as depicted by beacon transmissions 384*c*, 386*c* by MSTA B and MSTA C, respectively.

4.7.1.2. Active Scanning.

Figure 15:
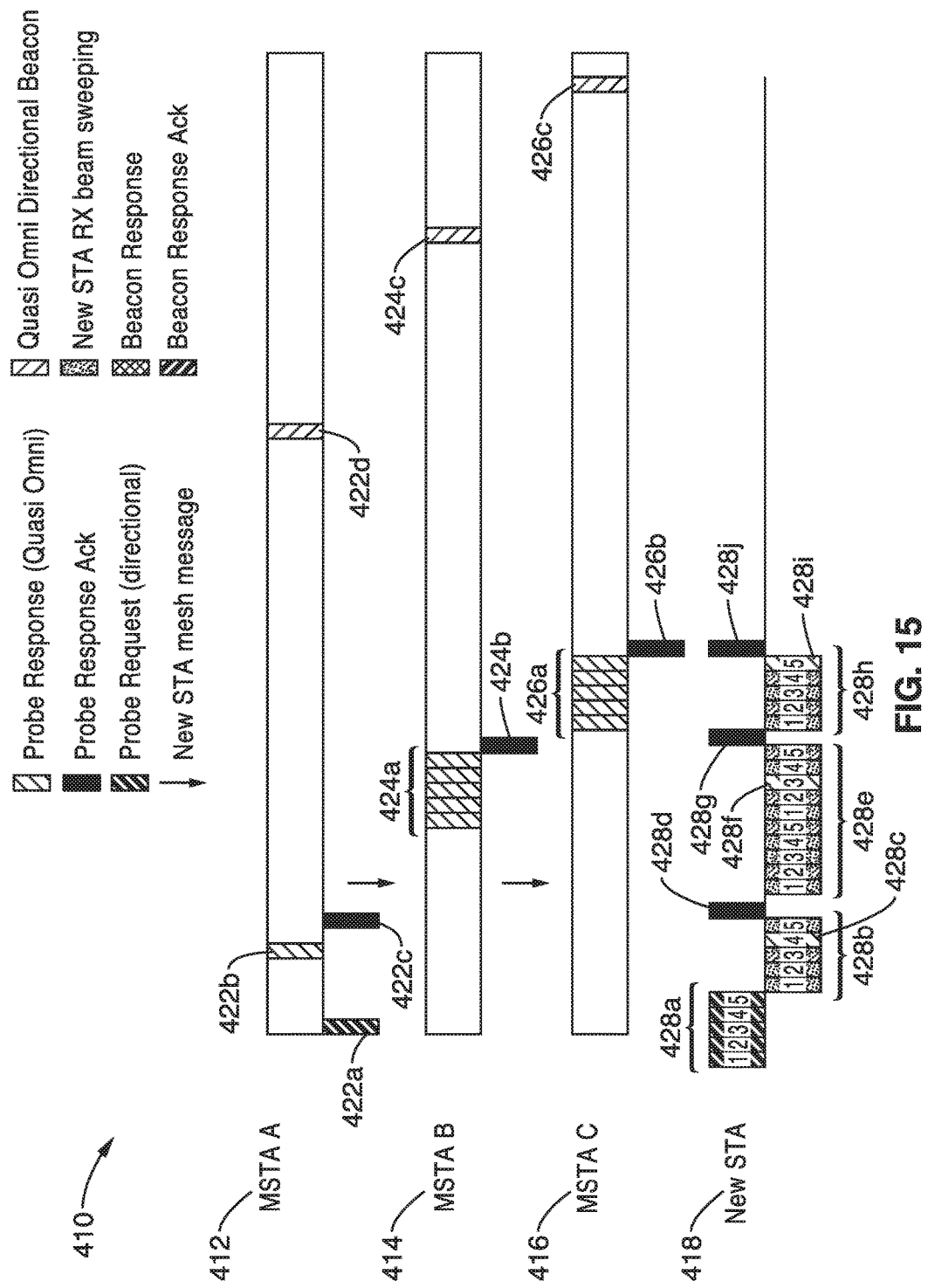
FIG. 15 is a message exchange diagram of a first scenario of directional mesh network under active scanning according to an embodiment of the present disclosure.

FIG. 15 illustrates an example embodiment 410 of message exchange for this Scenario 1 under active scanning. Message time lines for the stations are depicted for MSTA A 412, MSTA B 414, MSTA C 416 and the new STA 418. Again, the figure depicts packets above the line as transmitted packets and packets below the line as received packets. MSTA A 412, MSTA B 414, MSTA C 416 are always transmitting and receiving using Omni/Quasi Omni antennas, with new STA 418 always transmitting and receiving using directional antenna as per this example.

In Active Scanning the probe request is transmitted using a directional antenna, MSTAs are receiving using Omni/quasi Omni antennas. The new STA sends 428*a* probe requests in all directions. MSTAs are scanning for probe requests using quasi-Omni directional antennas. Once an MSTA, such as depicted by MSTA receiving 422*a* the probe request, then this MSTA (MSTA A) sends a probe response 422*b*, which is received 428*c* by the new station during scanning 428*b*. In response to receiving the probe 428*c*, the new STA sends an ACK 428*d* which is received 422*c* by MSTA A. The discovered MSTA reports the beam ID with highest SNR in the probe response. The new STA uses the same directional beam for transmitting the probe response acknowledgement.

The new STA requests mesh assistance in the probe request. The discovered MSTA informs the new STA of possible MSTA neighbors to discover in the probe response message. The discovered MSTA informs MSTA neighbors in the same geographical discovery set through direct communication of the existence of a new STA to assist, STA ID and capabilities. Possible MSTA neighbors alternate transmission of assistance message to the new STA, such as for a specific period of time (e.g., governed by a timer), in a quasi-Omni directional manner with some form of coordination of assistance being preferred.

The new STA scans 428*e* for the assistance messages in all directions. MSTA B and MSTA C repeats the transmission of the assistance messages from Omni/Quasi Omni antennas number of times equals to the number of the new STA discovery directions (beams). Once an assistance message 428*f* is received by the new STA from MSTA B 424*a*, then the new STA transmits an ACK 428*g* which is received 424*b* by MSTA B. It should be appreciated that the assistance response message 428*f* is sent back to the MSTA using the same beam upon which the assistance message was discovered.

Similarly, during scanning 428*h*, the new STA detects assistance message 426*a* as it receives 428*i*, to which the new STA transmits an assistance response message 428*j*, which is received 426*b* by MSTA C. In at least one embodiment, the new STA utilizes geographical data sent from the discovery node to alternate the pattern of beam sweeping to find the assistance message. It should be appreciated that in at least one embodiment, or mode, the pattern of sending the assistance message is a function of the beacon transmission time toward avoiding extra overhead (loss of time) in coordinating with other neighboring MSTAs.

As in the other embodiments, MSTAs that are in a light sleep or deep sleep can be triggered to wake and help assist the new STA, such as depicted by quasi-omni directional beacons 422*d*, 424*c*, and 426*c* being sent as seen in the figure.

4.7.2. Scenario 2

In scenario 2 the new node is using Omni/quasi Omni directional antennas for transmission and reception and MSTAs are using directional antennas for transmission and reception.

4.7.2.1. Scenario 2 in Passive Scanning

In passive scanning, the beacons are transmitted using directional antennas, while the new STA is scanning using an Omni/quasi Omni antenna.

Figure 16:
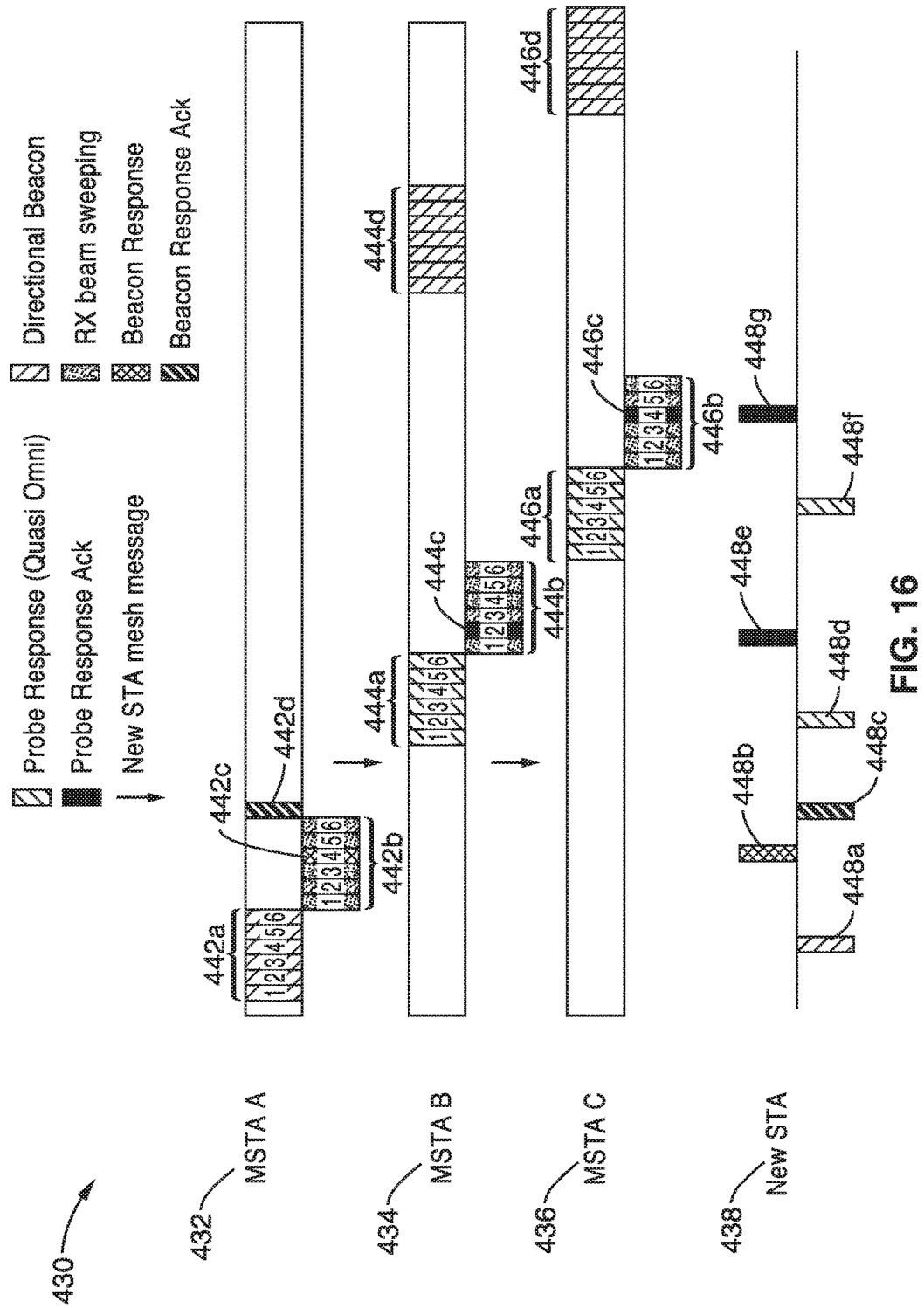
FIG. 16 is a message exchange diagram of a second scenario of directional mesh network under passive scanning according to an embodiment of the present disclosure.

FIG. 16 illustrates an example embodiment 430 of message exchange for this scenario. Message time lines for the stations are depicted for MSTA A 432, MSTA B 434, MSTA C 436 and the new STA 438. As in the preceding figures, packets depicted above the line represent transmitted packets, while packets depicted below the line represent received packets.

The new STA is searching for beacons using a quasi-Omni directional antenna (no sector antenna selections are depicted). MSTAs are transmitting beacons in all directions using directional antennas, including from MSTA A 442*a*. Beacons have an ID associated with them and a counter to the beacon response period. This beacon is received 448*a* to which a beacon response is sent 448*b*, received as 442*c* during directional scanning 442*b* by MSTA A. In response to receiving the beacon 442*c*, MSTA A transmits a beacon response ACK 442*d* that is received 448*c* by the new STA. It should be appreciated that the beacon response message is sent at the time slot associated with the beam ID for the beacon which was received with maximum (highest) SNR. The MSTA sweeps its beams in all directions and receives the beacon response once that beam is in use. The discovered MSTA will use that reported beam to send the beacon response acknowledgement.

The new STA requests mesh assistance in the beacon response. In the beacon response acknowledgment message, the discovered MSTA informs the new STA of possible MSTA neighbors to discover. The discovered MSTA informs MSTA neighbors in the same geographical discovery set through direct communication of the existence of a new STA to assist, STA ID and capabilities.

Possible MSTA neighbors alternate the transmission of the assistance message to the new STA, such as for a specific period (e.g., governed by a timer), in all directions with some form of coordination being preferred. Each of these assistance messages carries an indication of the beam ID and counter to the beam sweeping period.

The new STA scans for the assistance messages. In the example shown, an assistance message from directional transmission 444a is received 448d by the new STA which responds by sending an assistance response ACK 448e which is received 444c during scanning 444b by MSTA B.

In a similar manner the new STA is scanning and receives assistance message 448f as sent by MSTA C as part of transmission sweep 446a. The new STA sends an assistance acknowledgement 448g which is received 446c by MSTA C during direction scans 446b.

In at least one embodiment, the pattern of sending assistance messages is a function of beacon transmission time toward eliminating the overhead (time) required in coordinating with other neighboring MSTAs. MSTAs that are in light sleep or deep sleep can be triggered to wake and help assist the new STA as seen by directional beacon transmissions 444d and 446d, by MSTA B and MSTA C, respectively.

4.7.2.2. Scenario 2 in Active Scanning

In Scenario 2 Active Scanning the probe request is transmitted using an Omni/quasi Omni antenna, and the MSTAs are receiving using directional antennas.

Figure 17:
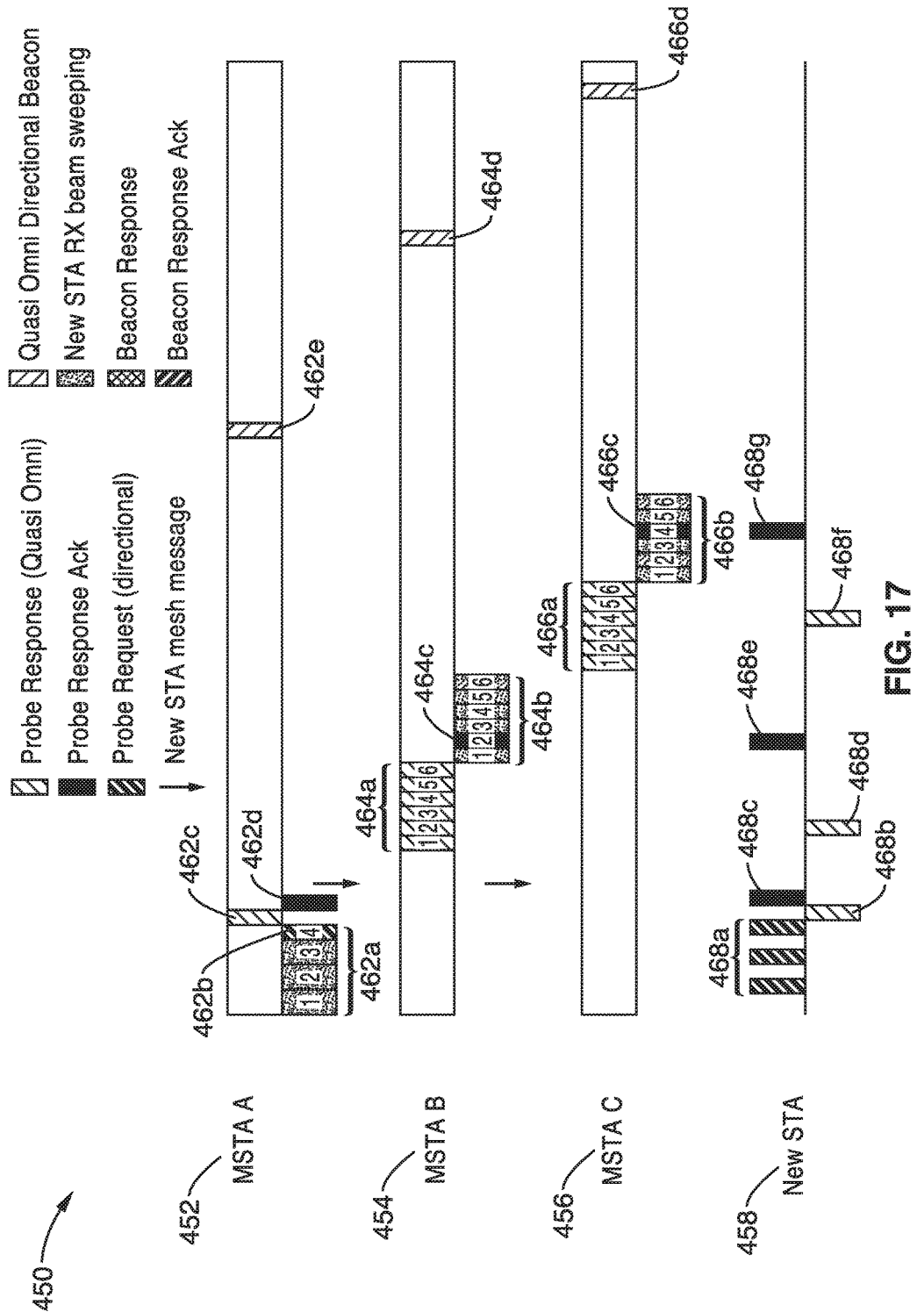
FIG. 17 is a message exchange diagram of a second scenario of directional mesh network under active scanning according to an embodiment of the present disclosure.

FIG. 17 illustrates an example embodiment 450 of message exchange for this scenario. Message time lines for the stations are depicted for MSTA A 452, MSTA B 454, MSTA C 456 and the new STA 458. As in the preceding figures, packets depicted above the line represent transmitted packets, with packets depicted below the line representing received packets.

The new STA sends probe requests 468a in quasi-Omni directional mode and awaits for a response before sending another probe request. MSTAs are scanning for probe requests using directional antennas. In this example, MSTA A is directionally scanning 462a, and receives probe request 462b, to which it sends probe response 462c, which is received 468b by the new STA, in response to which the new STA sends ACK 468c which is received 462d by MSTA A. The discovered MSTA uses the same beam it received the probe request from to transmit and receive the probe response and acknowledgement messages.

The new STA requests mesh assistance in the probe request. The discovered MSTA informs the new STA of possible MSTA neighbors to discover in the probe response message. The discovered MSTA informs MSTA neighbors in the same geographical discovery set through direct communication of the existence of a new STA to assist, STA ID and capabilities.

Possible MSTA neighbors alternate the transmissions of assistance messages to the new STA, such as for a specific period (e.g., governed by a timer), in all directions with a form of coordination being preferred. The assistance message carries the beam ID and a counter to the beam sweeping period.

The new STA scans for the assistance messages. Once an assistance message is received, an assistance response message is sent back to the MSTA at the time slot associated with the beam ID reported at the received assistance message. In the figure, assistance messages are directionally transmitted 464a from MSTA B at least one of which is received as 468d by new STA. The new STA responds with an assistance response ACK 468e which is received in direction slot 464c during directional scan 464b of MSTA B. Similarly, assistance from MSTA C is directionally transmitted 466a, and received 468f by the new STA which sends an ACK 468g that is received by MSTA C in direction 466c during directional scan 466b. In at least one embodiment or mode, the pattern of sending assistance messages is a function of beacon transmission time to reduce the overhead necessary for coordinating with other neighboring MSTAs.

MSTAs that are in a light sleep or deep sleep can be triggered to wake and help assist the new STA, as depicted by beacon transmissions 462e, 464d and 466d.

4.7.3. Scenario 3

In Scenario 3 the new node is using a directional antenna and the MSTAs are using directional antennas for transmission and reception.

4.7.3.1. Scenario 3 in Passive Scanning

In Passive Scanning: beacons are transmitted using directional antennas, and the new STA is scanning using a directional antenna.

Figure 18:
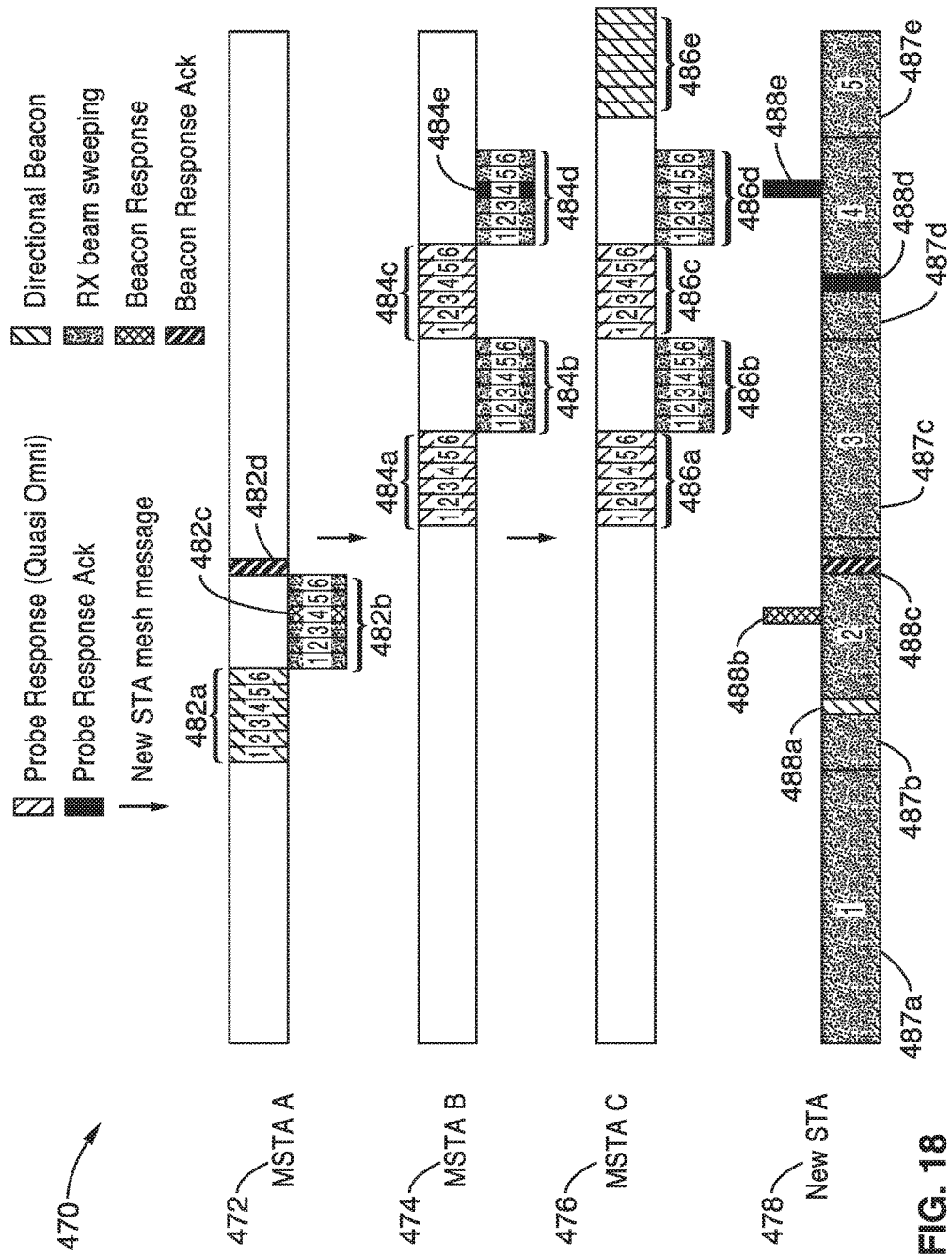
FIG. 18 is a message exchange diagram of a third scenario of directional mesh network under passive scanning according to an embodiment of the present disclosure.

FIG. 18 illustrates an example embodiment 470 of message exchange for this scenario. Message time lines for the stations are depicted for MSTA A 472, MSTA B 474, MSTA C 476 and the new STA 478. As in the preceding figures, packets depicted above the line are transmitted packets, with packets depicted below the line being received packets.

The new STA is searching during a first period 487a for beacons in all directions, but not detecting any. MSTAs are transmitting beacons in all directions using directional antennas. Beacons have an ID associated with them and a counter for the beacon response period.

In the example shown, one of the direction beacon transmissions 482a from MSTA A is received 488a in a period 2 487b of the new STA. In response, the new STA sends a beacon response 488b, received in direction slot 482c during its directional scanning 482b, to which an ACK is sent 482d as received by the new STA as 488c. Thus, once a beacon is found through scanning, beacon response and acknowledgment are exchanged. The new STA uses the same directional beam it received the beacon from for transmitting the beacon response and receiving the beacon response acknowledgement.

The beacon response message will be sent at the time slot that associates with the beam ID for the received beacon with maximum SNR. The MSTA sweeps its beams in all directions and receives the beacon response once that beam is in use. The discovered MSTA uses that reported beam to send the beacon response acknowledgement.

The new STA requests mesh assistance in the beacon response. The discovered MSTA informs the new STA of possible MSTA neighbors to discover in the beacon response acknowledgment message. The discovered MSTA informs MSTA neighbors in the same geographical discovery set through direct communication of the existence of a new STA to assist, STA ID and capabilities.

Possible MSTA neighbors alternate the transmission of the assistance message to the new STA, such as for a specific period (e.g., governed by a timer), in all directions with some form of coordination in at least one embodiment, although all MSTAs can transmit at the same time without any coordination. Each of these assistance messages carries an indication of beam ID and a counter for the beam sweeping period.

The new STA scans for the assistance messages in all directions, as seen in new STA period of direction 3 487c, during which it detects no assistance messages. Then during period of direction 4 487d of the new STA, assistance messages are received, such as from assistance messages 484c from MSTA B. Once an assistance message is received, an assistance response message is sent back to the MSTA using the same beam that discovered the assistance message. In this example, in response to the assistance message, a directional response 488e is sent by the new STA, which is received in direction slot 484e in directional scan 484e for MSTA B. In at least one embodiment or mode, the new STA utilizes geographical data sent from the discovered node to alternate the pattern of beam sweeping to find the assistance message. In at least one embodiment, the pattern of sending assistance messages is a function of beacon transmission time to reduce overhead (time) coordinating with other neighboring MSTAs. In the figure, MSTAs that are in a light sleep or deep sleep can be triggered 486e to wake and help assist the new STA, such as seen in its period 5 487e.

4.7.3.2. Scenario 3 in Active Scanning

In Scenario 3 Active Scanning of the probe request is transmitted using a directional antenna, and MSTAs are receiving using directional antennas.

Figure 19:
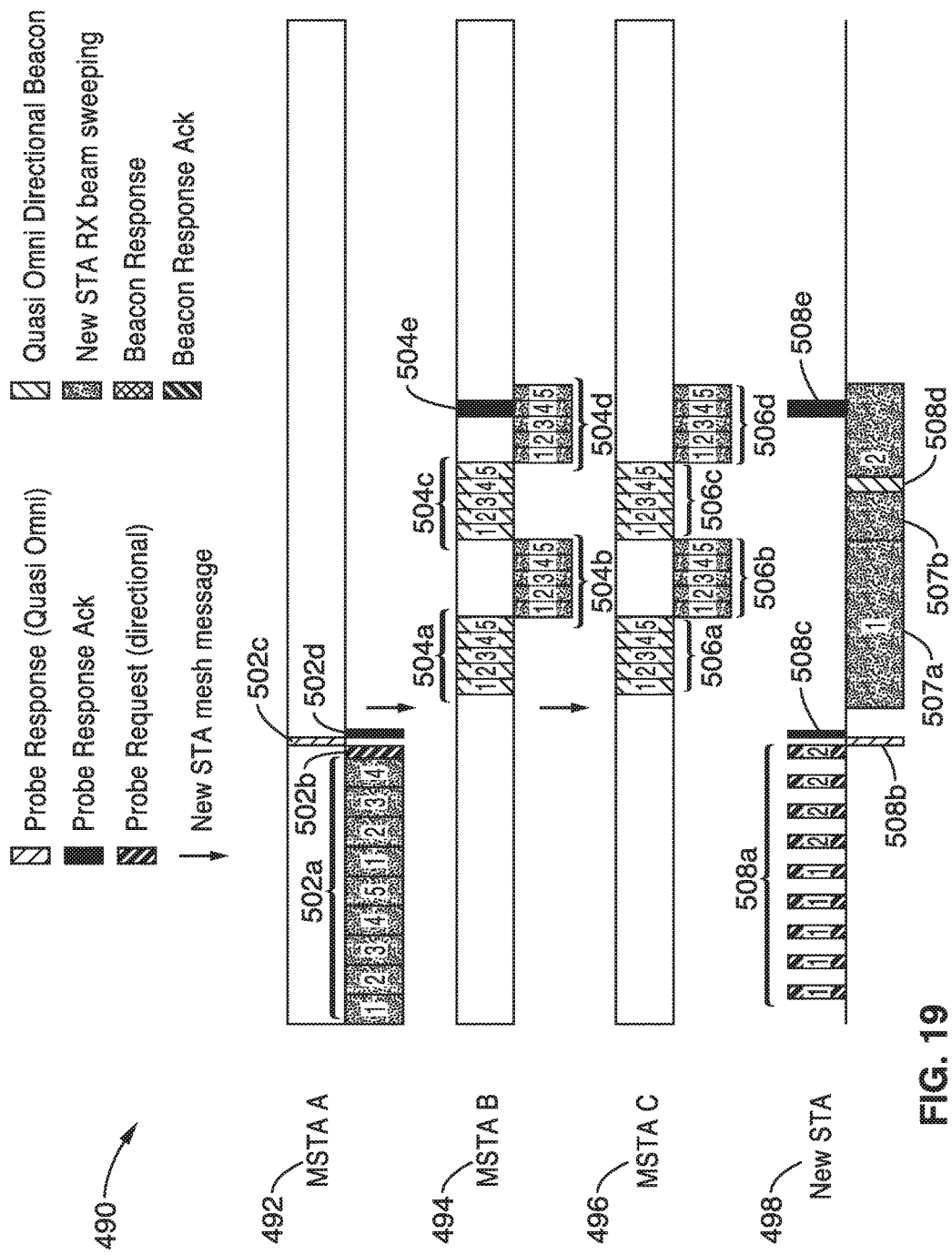
FIG. 19 is a message exchange diagram of a third scenario of directional mesh network under active scanning according to an embodiment of the present disclosure.

FIG. 19 illustrates an example embodiment 490 of message exchange for this scenario. Message time lines for the stations are depicted for MSTA A 492, MSTA B 494, MSTA C 496 and the new STA 498. As in the preceding figures, packets depicted above the line are transmitted packets, with packets depicted below the line being received packets.

The new STA sends 508a probe requests in all directions. The new STA will send a probe request multiple times in one direction, as noted by the four probe requests marked 1, before switching the beam and sending the probe requests marked 2. This is to guarantee that the MSTA will be able to sweep all its beams during that time and find this probe if the new STA beam aligns with one of the MSTA beams. MSTAs are scanning for probe request using directional antennas.

Once a MSTA receives a probe request, probe response and acknowledgement are exchanged. The discovered MSTA uses the same beam it received the probe request from to transmit and receive the probe response and acknowledgement messages.

The discovered MSTA reports the beam ID with highest SNR in the probe response. The new STA uses the same directional beam for transmitting the probe response acknowledgement. In this example, MSTA A is scanning 502a, and receives probe request 502b from multiple probe requests 508a, to which it sends a probe response 502c, which is received 508c by the new STA, which responds by sending an ACK 508c that is received 502d by the MSTA A.

The new STA requests mesh assistance in the probe request. The discovered MSTA informs the new STA of possible MSTA neighbors to discover in the probe response message. The discovered MSTA informs MSTA neighbors in the same geographical discovery set through direct communication of the existence of a new STA to assist, STA ID and capabilities. Possible MSTA neighbors alternate transmission of assistance message to the new STA, such as for a specific period (e.g., governed by a timer), in all directions with some form of coordination utilized in at least one embodiment of the disclosure. All MSTAs can transmit at the same time without any coordination if desired. The assistance message carries the beam ID and a counter to the beam sweeping period.

The new STA scans for the assistance messages in all directions. The time period 507a of sweeping the receive beams is of sufficient duration to allow the MSTA to transmit in all directions before sweeping the new STA receive beam. During this period, no assistance messages are detected by the new STA, despite MSTA A sending directional assistance messages 504a, and MSTA B sending directional assistance messages 506a, each of them alternating with directional scanning 504b, 506b, respectively.

Once an assistance message is received, an assistance response message is sent back to the MSTA using the same beam discovered that assistance message. In at least one embodiment or mode, the pattern of sending assistance messages is a function of beacon transmission time to reduce messaging overhead (time) in coordinating with other neighboring MSTAs. In the example, during period 2 507b of the new STA, MSTA B is transmitting assistance messages 504c, and MSTA C is transmitting assistance messages 506c. Of these, the new STA receives assistance message 508d and sends an ACK 508e that is received by MSTA B as message 504e.

MSTAs that are in a light sleep or deep sleep can be triggered to wake and help assist the new STA, this triggering is not depicted in the figure.

4.8. Eavesdropping Assistance

Other MSTAs can start offering assistance without a direct message sent to the MSTAs from the discovered MSTA. In at least one embodiment or mode, if an MSTA receives a probe response, a probe response acknowledgement, a beacon response or a beacon response acknowledgment sent between the new STA and another MSTA, then the MSTA begins offering assistance immediately. The new STA in this case will be unaware that it needs to switch to mesh discovery assistance mode. The new node will keep scanning even if one assistance is offered and succeeded to guarantee that it discovered all nearby neighbors.

5. Summary

Node scanning for neighbor discovery in a wireless mesh network can benefit by the disclosed mesh network protocol toward more readily discovering all potential neighbors. A new node uses regular scanning techniques to get access to one of the mesh nodes. Once the new node discovers at least one mesh node, it informs this node of its existence and requests mesh assistance. The discovered mesh node reaches out to other nodes in the same geographical discovery set and requests their assistance for the new node. The other mesh nodes in the geographical discovery set of another mesh node A or one of its sectors are nodes that potentially can be discovered if a new node is discovered by the mesh node A. The nodes in the geographical discovery set interrupt their transmission and start assisting the new node to have faster access. This assistance is in the form of transmitting messages to this node and waiting for its acknowledgement without the need to wait for the next beacon. A beacon is defined in 802.11 as a packet broadcast by the AP or the mesh node to announce the existence of the BSS, its capabilities and to help in synchronization and management of the transmission and reception. Once the new node acknowledges the assistance message, the mesh node can return to its normal transmission mode.

In millimeter wave communication, directional transmission and narrow beams can be utilized according to the present disclosure. The assistance messages are sent in all directions and the acknowledgement will be scanned across all directions.

Beamforming training can be scheduled following the new node acknowledging a mesh node assistance message, or can alternatively be scheduled later, to provide sufficient time for other mesh nodes to use the medium.

Coordination between mesh nodes to schedule the process of transmission and reception of assistance messages and their acknowledgments can be utilized, or otherwise nodes can be ordered utilizing a function of their beacon transmission time.

The enhancements described in the presented technology can be readily implemented within various wireless communication devices. It should also be appreciated that wireless data communication devices are typically implemented to include one or more computer processor devices (e.g., CPU, microprocessor, microcontroller, computer enabled ASIC, etc.) and one or more associated memories storing instructions (e.g., RAM, DRAM, NVRAM, FLASH, computer readable media, etc.) whereby programming (instructions) stored in the memory are executed on the processor to perform the steps of the various process methods described herein.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. An apparatus for wireless communication within a wireless mesh network, comprising: (a) a wireless communication circuit configured for wirelessly communicating with other wireless communication station nodes of a wireless mesh network in a geographical discovery set; (b) a processor coupled to said wireless communication circuit; and (c) a non-transitory computer-readable memory storing instructions executable by the processor; (d) wherein said instructions, when executed by the processor, perform steps comprising: (d)(i) scanning for wireless mesh nodes of a wireless mesh network to discover at least one of the wireless mesh nodes when a new node attempts to join said wireless mesh network; (d)(ii) enabling said new node to communicate with the discovered wireless mesh node about its existence and requesting mesh assistance; (d)(iii) generating communications by the discovered wireless mesh node to reach out to other nodes in the same geographical discovery set to request their assistance for the new node; and (d)(iv) enabling said other nodes to respond by transmitting an assistance message to the new node, said assistance message containing information about the wireless mesh network, and enabling said other nodes to wait for acknowledgement from the new node without the new node having to wait for a subsequent beacon frame on the wireless mesh network.

2. The apparatus of any preceding or following embodiment, wherein said instructions when executed by the processor further perform steps comprising having wireless mesh nodes operating as said other nodes providing an assistance message to the new node which includes said other nodes interrupting their transmissions with existing nodes in the wireless mesh network to commence assisting the new node to gain rapid access without awaiting for beacon frames.

3. The apparatus of any preceding or following embodiment, wherein said instructions when executed by the processor further perform steps comprising the new node acknowledging the assistance message, the mesh node which is providing assistance returns to its normal transmission activities in the wireless mesh network.

4. The apparatus of any preceding or following embodiment, wherein said wireless communication circuit is a millimeter wave communication circuit configured with directional transmission having a plurality of antenna pattern sectors each having different transmission directions.

5. The apparatus of any preceding or following embodiment, wherein said instructions when executed by the processor further perform steps comprising transmitting assistance messages in all directions by from the other nodes, with scanning performed in all directions for an acknowledgement from the new node.

6. The apparatus of any preceding or following embodiment, wherein said instructions when executed by the processor further perform steps comprising beamforming training of directional antenna transmission commencing at the time of, or after, the new node acknowledging the mesh node assistance message.

7. The apparatus of any preceding or following embodiment, wherein said instructions when executed by the processor further perform steps comprising coordinating between mesh nodes to schedule the process of communicating assistance messages with the new node.

8. The apparatus of any preceding or following embodiment, wherein said instructions when executed by the processor schedule the process of communicating assistance messages with the new node by communicating with other mesh nodes to render those assistance messages.

9. The apparatus of any preceding or following embodiment, wherein said instructions when executed by the processor perform the communicating with other mesh nodes to render those assistance messages, with a form of coordination based on timing of when these mesh nodes were communicated with to schedule communicating of assistance messages.

10. The apparatus of any preceding or following embodiment, wherein said instructions when executed by the processor perform the communicating with other mesh nodes to render those assistance messages, with a form of coordination based on beacon timing, in which nodes order the communication of assistance messages as a function of their beacon timing.

11. The apparatus of any preceding or following embodiment, wherein said instructions when executed by the processor perform the coordination based on beacon timing with the mesh node transmitting its beacon last starts transmitting the assistance message first.

12. The apparatus of any preceding or following embodiment, wherein said wireless communication apparatus performs a multiple-hop communication network protocol for directional transmission in the PHY layer of said multiple-hop communication network protocol.

13. The apparatus of any preceding or following embodiment, wherein said wireless communication apparatus performs a multiple-hop communication network protocol for directional transmission for a wireless communication station node operating in a mode selected from a group of station type modes consisting of source station, destination station, intermediate (hop) station, mesh access point, client station, mesh station, portal station, multiple input multiple output station, and single input single output station.

14. The apparatus of any preceding or following embodiment, wherein said wireless communication apparatus is configured for operating in a network containing any desired combination of mesh and non-mesh stations.

15. An apparatus for wireless communication within a wireless mesh network, comprising: (a) a wireless communication circuit configured for wirelessly communicating with other wireless communication station nodes of a wireless mesh network in a geographical discovery set, with said wireless communication circuit configured with directional transmission having a plurality of antenna pattern sectors each having different transmission directions; (b) a processor coupled to said wireless communication circuit; and (c) a non-transitory computer-readable memory storing instructions executable by the processor; (d) wherein said instructions, when executed by the processor, perform steps comprising: (d)(i) scanning for wireless mesh nodes of a wireless mesh network to discover at least one of the wireless mesh nodes when a new node attempts to join said wireless mesh network; (d)(ii) enabling said new node to communicate with the discovered wireless mesh node about its existence and requesting mesh assistance; (d)(iii) generating communications by the discovered wireless mesh node in reaching out to other nodes in the same geographical discovery set to request their assistance for the new node; and (d)(iv) enabling said other nodes to respond by transmitting an assistance message to the new node, said assistance message containing information about the wireless mesh network, and enabling said other nodes to wait for acknowledgement from the new node without the new node having to wait for a subsequent beacon frame on the wireless mesh network.

16. The apparatus of any preceding or following embodiment, wherein said assistance messages from other nodes are transmitted in all directions, with scanning performed in all directions for an acknowledgement from the new node.

17. The apparatus of any preceding or following embodiment, wherein beamforming training of directional antenna transmission commences at the time of, or after, the new node acknowledging the mesh node assistance message.

18. The apparatus of any preceding or following embodiment, wherein said instructions when executed by the processor further perform steps comprising coordinating between mesh nodes to schedule the process of communicating assistance messages with the new node, by communicating with other mesh nodes to render those assistance messages.

19. The apparatus of any preceding or following embodiment, wherein said wireless communication apparatus performs a multiple-hop communication network protocol for directional transmission in the PHY layer of said multiple-hop communication network protocol, for a network containing any desired combination of mesh and non-mesh stations.

20. A method of wireless communication within a wireless mesh network, with steps comprising: (a) scanning for wireless mesh nodes of a wireless mesh network to discover at least one of the wireless mesh nodes, within a geographical discovery set, when a new node attempts to join said wireless mesh network; (b) initiating communication from said new node to the discovered wireless mesh node about its existence and requesting mesh assistance; and (c) generating communications from the discovered wireless mesh node to reach out to other mesh nodes in the same geographical discovery set to request their assistance for the new node; (d) enabling said other mesh nodes to respond by transmitting an assistance message to the new node, said assistance message containing information about the wireless mesh network, and enabling said other nodes to wait for acknowledgement from the new node without the new node having to wait for a subsequent beacon frame on the wireless mesh network.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1A

Discovery Zone Formation Example - Neighbors List

| $L_1$ | $L_2$ | $L_3$ | $L_4$ | $L_5$ | $L_6$ |
|---|---|---|---|---|---|
| A-S4 | A-S4, C-S1 | C-S1 | C-S1, A-S3 | C-S1, B-S4, A-S3 | B-S4, A-S3 |

TABLE 1B

Discovery Zone Formation Example - Discovery Zone Update

| $L_1$ | $L_2$ | $L_3$ | $L_4$ | $L_5$ | $L_6$ |
|---|---|---|---|---|---|
| A-S4 = { } | A-S4 = {C-S1} | A-S4 = {C-S1} | A-S4 = {C-S1} | A-S4 = {C-S1} | A-S4 = {C-S1} |
| A-S3 = { } | A-S3 = { } | A-S3 = { } | A-S3 = {C-S1} | A-S3 = {C-S1, B-S4} | A-S3 = {C-S1, B-S4} |
| C-S1 = { } | C-S1 = {A-S4} | C-S1 = {A-S4} | C-S1 = {A-S4, A-S3} | C-S1 = {A-S4, A-S3, B-S4} | C-S1 = {A-S4, A-S3, B-S4} |
| B-S4 = { } | B-S4 = { } | B-S4 = { } | B-S4 = { } | B-S4 = {C-S1, A-S3} | B-S4 = {C-S1, A-S3} |

What is claimed is:

1. An apparatus for wireless communication within a wireless mesh network, comprising:
   (a) a wireless communication circuit configured for wirelessly communicating with other wireless communication station nodes of a wireless mesh network in a geographical discovery set;
   (b) a processor coupled to said wireless communication circuit; and
   (c) a non-transitory computer-readable memory storing instructions executable by the processor;
   (d) wherein said instructions, when executed by the processor, perform steps comprising:
      (i) scanning for wireless mesh nodes of a wireless mesh network to discover neighboring wireless mesh nodes, and deciding which neighbor to connect with, when a new node attempts to join said wireless mesh network;
      (ii) enabling said new node to communicate with the discovered wireless mesh node, about its existence and requesting mesh assistance;
      (iii) generating communications by the discovered wireless mesh node to reach out to other nodes in the same geographical discovery set to request their assistance for the new node so that all other nodes in the geographical discovery set are informed of the request for assistance; and (iv) enabling said other nodes in the geographical discovery set to respond by transmitting an assistance message to the new node, wherein said assistance message contains information about the wireless mesh network, and enabling said other nodes to wait for acknowledgement from the new node without the new node having to wait for a subsequent beacon frame on the wireless mesh network;

(v) coordinating between mesh nodes to schedule the process of communicating assistance messages with the new node; and (vi) scheduling the process of communicating assistance messages with the new node by communicating with other mesh nodes to render those assistance messages, with a form of coordination based on timing of when these mesh nodes were communicated with to schedule communicating of assistance messages;

(vii) wherein said coordination based on timing comprises coordination based on beacon timing, and wherein the mesh node that transmits its beacon last starts transmitting the assistance message first.

2. The apparatus as recited in claim 1, wherein said instructions when executed by the processor further perform steps comprising having wireless mesh nodes operating as said other nodes providing an assistance message to the new node which includes said other nodes interrupting their transmissions with existing nodes in the wireless mesh network to commence assisting the new node to gain rapid access without awaiting for beacon frames.

3. The apparatus as recited in claim 2, wherein said instructions when executed by the processor further perform steps comprising the new node acknowledging the assistance message, the mesh node which is providing assistance returns to its normal transmission activities in the wireless mesh network.

4. The apparatus as recited in claim 1, wherein said wireless communication circuit is a millimeter wave communication circuit configured with directional transmission having a plurality of antenna pattern sectors each having different transmission directions.

5. The apparatus as recited in claim 4, wherein said instructions when executed by the processor further perform steps comprising transmitting assistance messages in all directions by from the other nodes, with scanning performed in all directions for an acknowledgement from the new node.

6. The apparatus as recited in claim 4, wherein said instructions when executed by the processor further perform steps comprising beamforming training of directional antenna transmission commencing at the time of, or after, the new node acknowledging the mesh node assistance message.

7. The apparatus as recited in claim 1, wherein said instructions when executed by the processor further perform steps comprising coordinating between mesh nodes to schedule the process of communicating assistance messages with the new node.

8. The apparatus as recited in claim 7, wherein said instructions when executed by the processor schedule the process of communicating assistance messages with the new node by communicating with other mesh nodes to render those assistance messages.

9. The apparatus as recited in claim 8, wherein said instructions when executed by the processor perform the communicating with other mesh nodes to render those assistance messages, with a form of coordination based on timing of when these mesh nodes were communicated with to schedule communicating of assistance messages.

10. The apparatus as recited in claim 9, wherein said instructions when executed by the processor perform the coordination based on beacon timing, and wherein with the mesh node transmits its beacon last starts transmitting the assistance message first.

11. The apparatus as recited in claim 8, wherein said instructions when executed by the processor perform the communicating with other mesh nodes to render those assistance messages, with a form of coordination based on beacon timing, in which nodes order the communication of assistance messages as a function of their beacon timing.

12. The apparatus as recited in claim 1, wherein said wireless communication apparatus performs a multiple-hop communication network protocol for directional transmission in the PHY layer of said multiple-hop communication network protocol.

13. The apparatus as recited in claim 1, wherein said wireless communication apparatus performs a multiple-hop communication network protocol for directional transmission for a wireless communication station node operating in a mode selected from a group of station type modes consisting of source station, destination station, intermediate (hop) station, mesh access point, client station, mesh station, portal station, multiple input multiple output station, and single input single output station.

14. The apparatus as recited in claim 1, wherein said wireless communication apparatus is configured for operating in a network containing any desired combination of mesh and non-mesh stations.

15. The apparatus as recited in claim 1, wherein said instructions when executed by the processor further perform steps comprising coordinating between mesh nodes to provide coordinated assistance to the new node in which mesh nodes sequentially assist the new node.

16. An apparatus for wireless communication within a wireless mesh network, comprising:

(a) a wireless communication circuit configured for wirelessly communicating with other wireless communication station nodes of a wireless mesh network in a geographical discovery set, with said wireless communication circuit configured with directional transmission having a plurality of antenna pattern sectors each having different transmission directions;

(b) a processor coupled to said wireless communication circuit; and (c) a non-transitory computer-readable memory storing instructions executable by the processor;

(d) wherein said instructions, when executed by the processor, perform steps comprising:

(i) scanning for wireless mesh nodes of a wireless mesh network to discover neighboring wireless mesh nodes, and deciding which neighbor to connect with, when a new node attempts to join said wireless mesh network;

(ii) enabling said new node to communicate with the discovered wireless mesh node about its existence and requesting mesh assistance;

(iii) generating communications by the discovered wireless mesh node in reaching out to other nodes in the same geographical discovery set to request their assistance for the new node so that all other nodes in the geographical discovery set are informed of the request for assistance; and (iv) enabling said other nodes in the geographical discovery set to respond by transmitting an assistance message to the new node, wherein said assistance message contains information about the wireless mesh network, and enabling said other nodes to wait for acknowledgement from the new node without the new node having to wait for a subsequent beacon frame on the wireless mesh network;
(v) coordinating between mesh nodes to schedule the process of communicating assistance messages with the new node; and
(vi) scheduling the process of communicating assistance messages with the new node by communicating with other mesh nodes to render those assistance messages, with a form of coordination based on timing of when these mesh nodes were communicated with to schedule communicating of assistance messages;
(vii) wherein said coordination based on timing comprises coordination based on beacon timing, and wherein the mesh node that transmits its beacon last starts transmitting the assistance message first.

17. The apparatus as recited in claim 16, wherein said assistance messages from other nodes are transmitted in all directions, with scanning performed in all directions for an acknowledgement from the new node.

18. The apparatus as recited in claim 16, wherein beamforming training of directional antenna transmission commences at the time of, or after, the new node acknowledging the mesh node assistance message.

19. The apparatus as recited in claim 16, wherein said instructions when executed by the processor further perform steps comprising coordinating between mesh nodes to schedule the process of communicating assistance messages with the new node, by communicating with other mesh nodes to render those assistance messages.

20. The apparatus as recited in claim 16, wherein said wireless communication apparatus performs a multiple-hop communication network protocol for directional transmission in the PHY layer of said multiple-hop communication network protocol, for a network containing any desired combination of mesh and non-mesh stations.

21. The apparatus as recited in claim 16, wherein said instructions when executed by the processor further perform steps comprising coordinating between mesh nodes to provide coordinated assistance to the new node in which mesh nodes sequentially assist the new node.

22. A method of wireless communication within a wireless mesh network, with steps comprising:
(a) scanning for wireless mesh nodes of a wireless mesh network to discover neighboring wireless mesh nodes, and deciding which neighbor to connect with, within a geographical discovery set, when a new node attempts to join said wireless mesh network;
(b) initiating communication from said new node to the discovered wireless mesh node about its existence and requesting mesh assistance; and
(c) generating communications from the discovered wireless mesh node to reach out to other mesh nodes in the same geographical discovery set to request their assistance for the new node, so that all other nodes in the geographical discovery set are informed of the request for assistance;
(d) enabling said other mesh nodes in the geographical discovery set to respond by transmitting an assistance message to the new node, wherein said assistance message contains information about the wireless mesh network, and enabling said other nodes to wait for acknowledgement from the new node without the new node having to wait for a subsequent beacon frame on the wireless mesh network;
(e) coordinating between mesh nodes to schedule the process of communicating assistance messages with the new node; and
(f) scheduling the process of communicating assistance messages with the new node by communicating with other mesh nodes to render those assistance messages, with a form of coordination based on timing of when these mesh nodes were communicated with to schedule communicating of assistance messages;
(g) wherein said coordination based on timing comprises coordination based on beacon timing, and wherein the mesh node that transmits its beacon last starts transmitting the assistance message first.

23. An apparatus for wireless communication within a wireless mesh network, comprising:
(a) a wireless communication circuit configured for wirelessly communicating with other wireless communication station nodes of a wireless mesh network in a geographical discovery set;
(b) a processor coupled to said wireless communication circuit; and
(c) a non-transitory computer-readable memory storing instructions executable by the processor;
(d) wherein said instructions, when executed by the processor, perform steps comprising:
(i) scanning for wireless mesh nodes of a wireless mesh network to discover at least one of the wireless mesh nodes when a new node attempts to join said wireless mesh network;
(ii) enabling said new node to communicate with the discovered wireless mesh node, about its existence and requesting mesh assistance;
(iii) generating communications by the discovered wireless mesh node to reach out to other nodes in the same geographical discovery set to request their assistance for the new node;
(iv) enabling said other nodes to respond by transmitting an assistance message to the new node, said assistance message containing information about the wireless mesh network, and enabling said other nodes to wait for acknowledgement from the new node without the new node having to wait for a subsequent beacon frame on the wireless mesh network;
(v) coordinating between mesh nodes to schedule the process of communicating assistance messages with the new node; and
(vi) scheduling the process of communicating assistance messages with the new node by communicating with other mesh nodes to render those assistance messages, with a form of coordination based on timing of when these mesh nodes were communicated with to schedule communicating of assistance messages;
(vii) wherein said coordination based on timing comprises coordination based on beacon timing, and wherein the mesh node that transmits its beacon last starts transmitting the assistance message first; and
(viii) wherein said wireless communication apparatus performs a multiple-hop communication network protocol for directional transmission for a wireless communication station node operating in a mode selected from a group of station type modes consisting of source station, destination station, intermediate (hop) station, mesh access point, client station, mesh station, portal station, multiple input multiple output station, and single input single output station.

* * * * *